United States Patent
Park

(10) Patent No.: US 10,917,855 B2
(45) Date of Patent: *Feb. 9, 2021

(54) METHOD AND APPARATUS FOR PUSCH/PUCCH POWER SCALING CONSIDERING DUAL CONNECTIVITY IN POWER LIMITED STATE

(71) Applicant: HUAWEI TECHNOLOGIES CO., LTD., Guangdong (CN)

(72) Inventor: Dong Hyun Park, Seoul (KR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,156

(22) Filed: Nov. 13, 2019

(65) Prior Publication Data

US 2020/0084728 A1    Mar. 12, 2020

Related U.S. Application Data

(63) Continuation of application No. 16/193,325, filed on Nov. 16, 2018, now Pat. No. 10,506,524, which is a (Continued)

(30) Foreign Application Priority Data

Mar. 21, 2014 (KR) .................. 10-2014-0033276

(51) Int. Cl.
*H04W 52/14* (2009.01)
*H04W 76/15* (2018.01)
(Continued)

(52) U.S. Cl.
CPC ....... *H04W 52/146* (2013.01); *H04W 52/325* (2013.01); *H04W 52/34* (2013.01); (Continued)

(58) Field of Classification Search
CPC ... H04W 52/146; H04W 76/00; H04W 52/34; H04W 72/12; H04W 72/00; H04W 88/06; Y02B 60/50
See application file for complete search history.

(56) References Cited

U.S. PATENT DOCUMENTS 9,918,279 B2    3/2018  Park et al.
2011/0237288 A1*  9/2011  Ratasuk ............... H04W 52/32
                                                  455/522

(Continued)

FOREIGN PATENT DOCUMENTS

KR    20040020507 A    3/2004

OTHER PUBLICATIONS

Ericsson, Considerations on power control for Dual Connectivity. 3GPP TSG-RAN WG2 #84 San Francisco, USA, Nov. 11-15, 2013, R2-134234, 4 pages.
(Continued)

*Primary Examiner* — Afshawn M Towfighi
(74) *Attorney, Agent, or Firm* — Fish & Richardson P.C.

(57) ABSTRACT

Provided is a method and apparatus for executing an uplink channel power control in dual connectivity configuration when power is limited. An appropriate power controlling method may be determined based on a priority, and may be applied to a UE that has dual connectivity with a Master eNB (MeNB) and a Secondary eNB (SeNB) in a network.

22 Claims, 17 Drawing Sheets

Related U.S. Application Data continuation of application No. 15/880,554, filed on Jan. 26, 2018, now Pat. No. 10,172,095, which is a continuation of application No. 15/470,844, filed on Mar. 27, 2017, now Pat. No. 9,918,279, which is a continuation of application No. 15/358,394, filed on Nov. 22, 2016, now Pat. No. 9,642,091, which is a continuation of application No. 15/174,689, filed on Jun. 6, 2016, now Pat. No. 9,538,479, which is a continuation of application No. 14/664,746, filed on Mar. 20, 2015, now Pat. No. 9,386,532.

(51) Int. Cl.
| | | |
|---|---|---|
| *H04W 52/34* | (2009.01) | |
| *H04W 52/36* | (2009.01) | |
| *H04W 76/00* | (2018.01) | |
| *H04W 52/32* | (2009.01) | |
| *H04W 72/04* | (2009.01) | |
| *H04W 72/12* | (2009.01) | |
| *H04W 76/16* | (2018.01) | |
| *H04W 72/00* | (2009.01) | |
| *H04W 88/06* | (2009.01) | |

(52) U.S. Cl.
CPC ....... *H04W 52/346* (2013.01); *H04W 52/367* (2013.01); *H04W 72/0413* (2013.01); *H04W 72/1242* (2013.01); *H04W 72/1284* (2013.01); *H04W 76/00* (2013.01); *H04W 76/15* (2018.02); *H04W 76/16* (2018.02); *H04W 72/00* (2013.01); *H04W 72/12* (2013.01); *H04W 88/06* (2013.01)

(56) References Cited

U.S. PATENT DOCUMENTS

2012/0093011 A1* 4/2012 Ranta-Aho ........... H04L 5/0053
370/252

2013/0176953 A1 7/2013 Stern-Berkowitz et al.
2015/0341865 A1* 11/2015 Yang ..................... H04L 5/14
455/522

OTHER PUBLICATIONS

LG Electronics Inc.,Management of UE Transmit Power in Dual Connectivity. 3GPP TSG-RAN WG2 Meeting #84 San Francisco, USA, Nov. 11-Nov. 15, 2013, R2-134048, 2 pages.

Panasonic, Uplink transmission power management and PHR reporting for dual connectivity. 3GPP TSG RAN WG2 Meeting #84 San Francisco, USA, Nov. 11-15, 2013, R2-133945, 3 pages.

3GPP TS 36.213 V12.1.0 (Mar. 2014), 3rd Generation Partnership Project;Technical Specification Group Radio Access Network;Evolved Universal Terrestrial Radio Access (E-UTRA);Physical layer procedures(Release 12), 186 pages.

3GPP TS 36.300 V12.1.0 (Mar. 2014), 3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 12), 209 pages.

3GPP TS 36.331 V12.1.0 (Mar. 2014), 3rd Generation Partnership Project;Technical Specification Group Radio Access Network;Evolved Universal Terrestrial Radio Access (E-UTRA);Radio Resource Control (RRC);Protocol specification (Release 12), 355 pages.

3GPP TS 36.213 V12.0.0 (Dec. 2013), 3rd Generation Partnership Project;Technical Specification Group Radio Access Network;Evolved UniversalTerrestrial Radio Access (E-UTRA);Physical layer procedures(Release 12), 186 pages.

International Search Report and Written Opinion issued in International Application No. PCT/KR2015/002776 dated Jun. 29, 2015, 70 pages.

Office Action issued in Korean Application No. 2014-0033276 dated Aug. 28, 2020, 3 pages (with English translation).

* cited by examiner (a)

(b)

METHOD AND APPARATUS FOR PUSCH/PUCCH POWER SCALING CONSIDERING DUAL CONNECTIVITY IN POWER LIMITED STATE

CROSS-REFERENCE TO RELATED APPLICATIONS

This application is a continuation of U.S. patent application Ser. No. 16/193,325, filed on Nov. 16, 2018, which is a continuation of U.S. patent application Ser. No. 15/880,554, filed on Jan. 26, 2018, now U.S. Pat. No. 10,172,095, which is a continuation of U.S. patent application Ser. No. 15/470,844, filed on Mar. 27, 2017, now U.S. Pat. No. 9,918,279, which is a continuation of U.S. patent application Ser. No. 15/358,394, filed on Nov. 22, 2016, now U.S. Pat. No. 9,642,091, which is a continuation of U.S. patent application Ser. No. 15/174,689, filed on Jun. 6, 2016, now U.S. Pat. No. 9,538,479, which is a continuation of U.S. patent application Ser. No. 14/664,746, filed on Mar. 20, 2015, now U.S. Pat. No. 9,386,532, and claims priority from and the benefit of Korean Patent Application No. 10-2014-0033276, filed on Mar. 21, 2014, each of which is hereby incorporated by reference in its entirety.

BACKGROUND

Exemplary embodiments relate to wireless communication, and more particularly, to a method and apparatus for executing PUSCH/PUCCH power control and/or power scaling in a power-limited state.

DESCRIPTION

In a wireless communication system, a User Equipment (UE) may execute wireless communication through two or more evolved NodeBs (eNB) from among eNBs forming at least one serving cell. This is an example of configuring dual connectivity with at least two nodes. In other words, the dual connectivity refers to an operation in which a UE that is in a Radio Resource Control (RRC) connected state with two or more different network points, consumes radio resources provided by the network points. Here, the at least two different network points may be a plurality of eNBs that are physically or logically distinguished from one another. One of them may be a Master eNB (MeNB) and the remaining eNBs may be Secondary eNBs (SeNB).

In the dual connectivity, each eNB transmits downlink data and receives uplink data, through a bearer configured for a UE. In this instance, a bearer may be configured through a single eNB, or two or more different eNBs. In addition, in the case of dual connectivity, at least one serving cell may be configured for each eNB, and each serving cell may operate in an activated or deactivated state. In this instance, a Primary (serving) Cell that may be configurable based on an existing Component Carrier Aggregation (CA), may be configured for the MeNB. Here, the CA is to effectively use small band segments, which binds a plurality of physically continuous or non-continuous bands in a frequency domain so as to provide an effect same as when an eNB uses a logically large band.

For a SeNB, only a Secondary (serving) Cell (SCell) may be configured. In at least one of the SCells of SeNBs, a Physical Uplink Control CHannel (PUCCH) which is a physical channel for transmitting uplink control information may be configured. A serving cell group that is provided by the MeNB is referred to as a Master Cell Group (MCG), and a serving cell group that is provided by the SeNB is referred to as a Secondary Cell Group (SCG).

An eNB may use power headroom information of a UE to effectively utilize resources of the UE. Power control technology is an essential technology for minimizing interference elements for effective distribution of resources in wireless communication and for reducing battery power consumption. When a UE provides power headroom information to an eNB, the eNB may estimate an uplink maximum transmission power $\hat{P}_{CMAX}(i)$ that may be allocated to the UE. Therefore, the eNB may provide the UE with uplink scheduling such as Transmit Power Control (TPC), Modulation and Coding Scheme (MCS), a bandwidth, or the like, within the range of the estimated uplink maximum transmission power.

Unlike the assumption in the existing Long Term Evolution (LTE) system, when dual connectivity is configured for a UE, the UE may connect to at least two eNBs having independent schedulers, and transmit and receive data. Therefore, there is a desire for a new transmission power control method for a UE due to a difference in physical channel properties between a UE and a plurality of eNBs that the UE connects to (for example, a pathloss), a different Quality of Service (QoS), a dual connectivity mode (for example, 1A/3C), independent schedulers of the plurality of eNBs, or the like. Particularly, power of a UE in dual connectivity may be limited (for example, a total transmit power of a UE may exceed $\hat{P}_{CMAX}(i)$). Under the above situation, there is a desire for a power scaling scheme for a UE to execute uplink transmission to a plurality of eNBs through a plurality of uplink channels in a single subframe.

The above information disclosed in this Background section is only for enhancement of understanding of the background of the inventive concept and therefore it may contain information that does not form any part of the prior art nor what the prior art may suggest to a person of ordinary skill in the art.

SUMMARY

One or more exemplary embodiments provide a method and apparatus for controlling a transmit power reduction of an uplink channel based on a priority determination between two or more uplink channels.

Additional aspects will be set forth in the detailed description which follows, and, in part, will be apparent from the disclosure, or may be learned by practice of the inventive concept.

One or more exemplary embodiments provide a Physical Uplink Shared CHannel (PUSCH) power control method and an apparatus thereof, when power is limited, while configuring dual connectivity with at least two eNodeBs.

One or more exemplary embodiments provide a PUCCH power control method and an apparatus thereof, when power is limited.

One or more exemplary embodiments provide a PUSCH power scaling method and an apparatus thereof, for a User Equipment (UE) for which dual connectivity is configured.

One or more exemplary embodiments provide a PUCCH power scaling method and an apparatus thereof, for a UE for which dual connectivity is configured.

According to one or more exemplary embodiments, a UE may variously set a degree of power scaling based on a determination whether a PUSCH is transmitted through a cell in a MCG or a cell in an SCG.

According to one or more exemplary embodiments, a UE may variously set a degree of power scaling based on a determination whether a PUSCH and a PUCCH are simultaneously transmitted.

According to one or more exemplary embodiments, a UE may variously set a degree of power scaling based on a determination whether a PUSCH carries Uplink Control Information (UCI).

One or more exemplary embodiments provide a method of controlling a transmit power by a User Equipment (UE), the UE being capable of configuring dual connectivity, the method including: establishing a Radio Resource Control (RRC) connection with a Master evolved NodeB (MeNB) through a primary serving cell, the MeNB being associated with a Master Cell Group (MCG) including one or more serving cells configurable for the UE; establishing a connection with a Secondary eNB (SeNB), the SeNB being associated with a Secondary Cell Group (SCG) including one or more serving cells configurable for the UE; determining to transmit an uplink channel through a serving cell of the MCG and to transmit an uplink channel through a serving cell of the SCG; determining whether to control a transmit power reduction for at least one of the uplink channel determined to be transmitted through the serving cell of the MCG and the uplink channel determined to be transmitted through the serving cell of the SCG; determining a priority between the uplink channel determined to be transmitted through the serving cell of the MCG and the uplink channel determined to be transmitted through the serving cell of the SCG, based on Uplink Control Information (UCI) included in at least one of the uplink channels and based on a type of a cell group; controlling the transmit power reduction for a lower-prioritized uplink channel from among the uplink channels; and transmitting, from the UE, the uplink channels through the respective serving cells after the control of the transmit power reduction.

One or more exemplary embodiments provide a method of controlling a transmit power by a User Equipment (UE), the UE being capable of configuring dual connectivity, the method including: establishing a Radio Resource Control (RRC) connection with a Master evolved NodeB (MeNB) through a primary serving cell, the MeNB being associated with a Master Cell Group (MCG) including one or more serving cells configurable for the UE; establishing a connection with a Secondary eNB (SeNB), the SeNB being associated with a Secondary Cell Group (SCG) including one or more serving cells configurable for the UE; determining to transmit an uplink channel through a first serving cell of the SCG and to transmit an uplink channel through a second serving cell of the SCG; determining whether to control a transmit power reduction for at least one of the uplink channel determined to be transmitted through the first serving cell of the SCG and the uplink channel determined to be transmitted through the second serving cell of the SCG; determining a priority between the uplink channel determined to be transmitted through the serving cell of the MCG and the uplink channel determined to be transmitted through the serving cell of the SCG, based on a determination whether Uplink Control Information (UCI) is included in at least one of the uplink channels and a determination of a UCI characteristic; controlling the transmit power reduction for a lower-prioritized uplink channel from among the uplink channels; and transmitting, from the UE, the uplink channels through the respective serving cells after the control of the transmit power reduction.

One or more exemplary embodiments provide a method of controlling a transmit power by a User Equipment (UE), the UE being capable of configuring dual connectivity, the method including: establishing a Radio Resource Control (RRC) connection through a primary serving cell included in a Master Cell Group (MCG), the MCG being associated with a Master evolved NodeB (MeNB) providing one or more serving cells configurable for the UE; configuring, for the UE, a serving cell included in a Secondary Cell Group (SCG), the SCG being associated with a Secondary eNB (SeNB) providing one or more secondary serving cells configurable for the UE; determining to transmit uplink channels, in subframe i, through two or more serving cells selected from at least one of the MCG and the SCG; determining whether to control a transmit power reduction for at least one of the uplink channels; determining a priority between the uplink channels, based on a determination whether Uplink Control Information (UCI) is included in at least one of the uplink channels and a determination of a UCI characteristic; controlling the transmit power reduction for a lower-prioritized uplink channel from among the uplink channels; and transmitting, from the UE, the uplink channels through the respective serving cells after the control of the transmit power reduction.

According to one or more exemplary embodiments, a PUSCH/PUCCH transmission power may be effectively controlled with respect to a User Equipment (UE) having dual connectivity with a Master eNB (MeNB) and a Secondary eNB (SeNB) in a network, and, based on the same, the performance of uplink scheduling may be improved.

DETAILED DESCRIPTION OF THE ILLUSTRATED EMBODIMENTS

Figure 1:
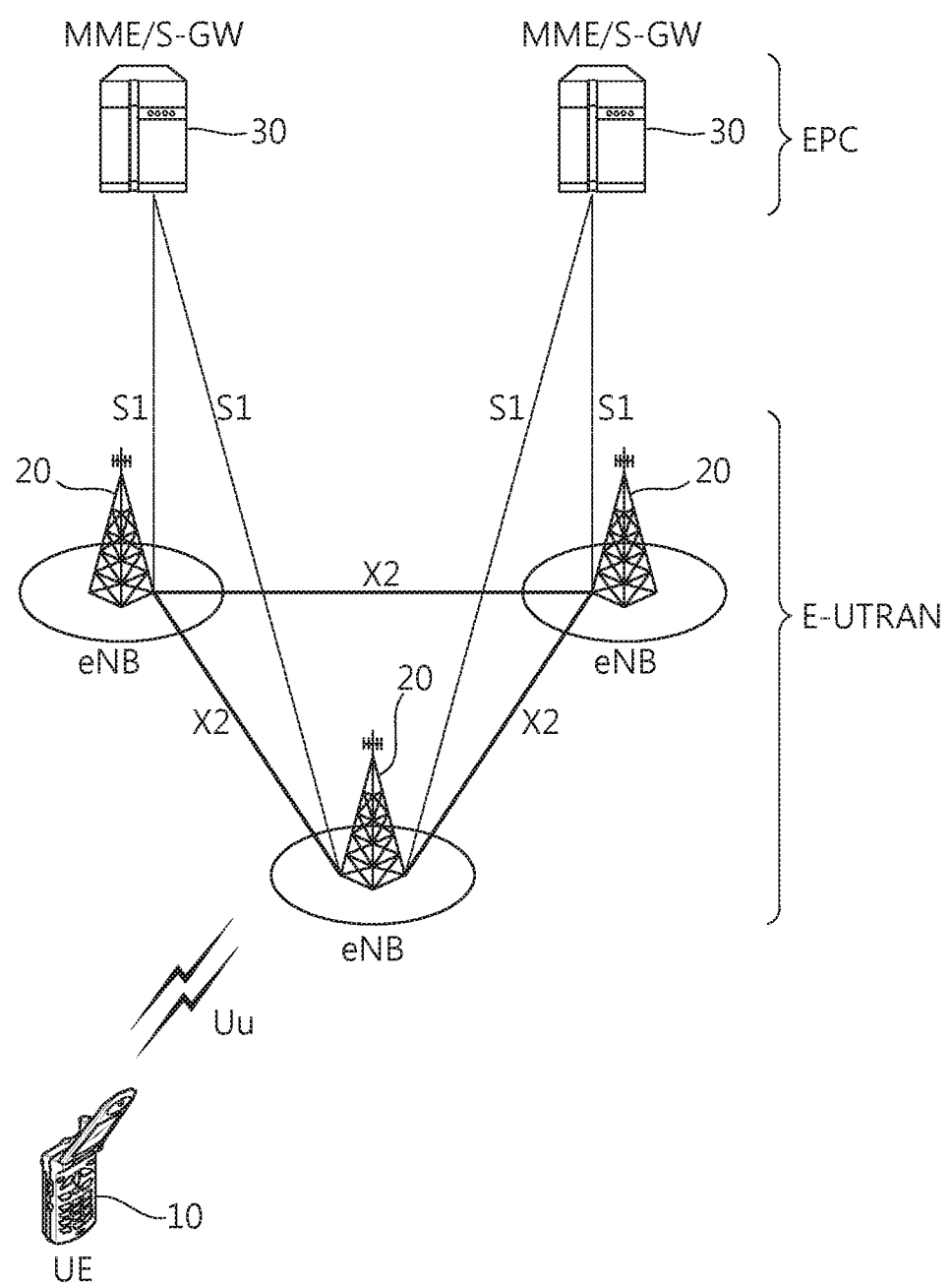
FIG. 1 is a diagram illustrating a network architecture of a wireless communication system, according to one or more exemplary embodiments.

Hereinafter, exemplary embodiments will be described with reference to the accompanying drawings. In the following description, the same elements will be designated by the same reference numerals although they are shown in different drawings. Further, in the following description, a detailed description of known functions and configurations incorporated herein will be omitted when it may make the subject matter of exemplary embodiments rather unclear.

In addition, the present specification provides descriptions in association with a wireless communication network, and tasks executed in the wireless communication network may be performed in the process where a system (for example, a base station) that manages the corresponding wireless communication network controls a network and transmits data, or may be performed in a terminal that connects to the corresponding wireless network.

FIG. 1 is a diagram illustrating a network architecture of a wireless communication system, according to one or more exemplary embodiments.

FIG. 1 illustrates the network architecture of an Evolved-Universal Mobile Telecommunications System (E-UMTS), which is an example of a wireless communication system. The E-UMTS system may be Evolved-UMTS Terrestrial Radio Access (E-UTRA), Long Term Evolution (LTE), or LTE-advanced (LTE-A). The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), Single Carrier-FDMA (SC-FDMA), OFDM-FDMA, OFDM-TDMA, OFDM-CDMA, and the like.

Referring to FIG. 1, an Evolved-UMTS Terrestrial Radio Access Network (E-UTRAN) includes a base station (hereinafter referred to as an evolved NodeB (eNB) 20) that provides a terminal (hereinafter referred to as User Equipment (UE) 10) with a Control Plane (CP) and a User Plane (UP).

The UE 10 may be a stationary or mobile entity, and may be referred to as a Mobile station (MS), an Advanced MS (AMS), a User Terminal (UT), a Subscriber Station (SS), a wireless device, or the like.

The eNB 20 may generally refer to a station that communicates with the UE 10, and may be referred to as a Base Station (BS), a Base Transceiver System (BTS), an access point, a femto-eNB, a pico-eNB, a Home eNB, a relay, or the like. The eNBs 20 may be physically connected to one another through an optical cable or a Digital Subscriber Line (DSL), or the like, and may exchange signals or messages through an X2 or Xn interface. FIG. 1 exemplifies the case in which eNBs 20 are connected to one another through an X2 interface.

Hereinafter, descriptions associated with a physical connection will be omitted and a logical connection will be described. As illustrated in FIG. 1, the eNB 20 is connected to an Evolved Packet Core (EPC) 30 through an S1 interface. In particular, the eNB 20 is connected to a Mobility Management Entity (MME) through an S1MME interface, and is connected to a Service Gateway (S-GW) through an S1-U interface. The eNB 20 may exchange context information of the UE 10 and information for supporting mobility of the UE 10, with the MME through the S1-MME interface. In addition, the eNB 20 may exchange data to be provided to each UE 10, with an S-GW through the S1-U interface.

Although not illustrated in FIG. 1, the EPC 30 includes an MME, an S-GW, and a Packet data network-Gateway (P-GW). The MME has access information of the UE 10 or information associated with capability of the UE 10, and the information may be used for mobility management of the UE 10. The S-GW is a gateway having an E-UTRAN as an end point, and the P-GW is a gateway having a Packet Data Network (PDN) as an end point.

The E-UTRAN and the EPC 30 together are referred to as an Evolved Packet System (EPS), and a traffic flow from a radio link through which the UE 10 accesses the eNB 20 to a PDN that provides a connection to a service entity, may be operated based on an Internet Protocol (IP).

A radio interface between the UE 10 and the eNB 20 is referred to as a "Uu interface." The layers of a Radio Interface Protocol between the UE 10 and a network are classified into a first layer (L1), a second layer (L2), and a third layer (L3), which are defined by 3rd Generation Partnership Project (3GPP)-affiliated wireless communication system, such as, UMTS, LTE, LTE-Advanced, or the like. A physical layer belongs to the first layer among them, provides information transfer services using a physical channel, and a Radio Resource Control (RRC) layer located in the third layer provides radio resources between the UE 10 and the network by exchanging an RRC message.

Figure 2:
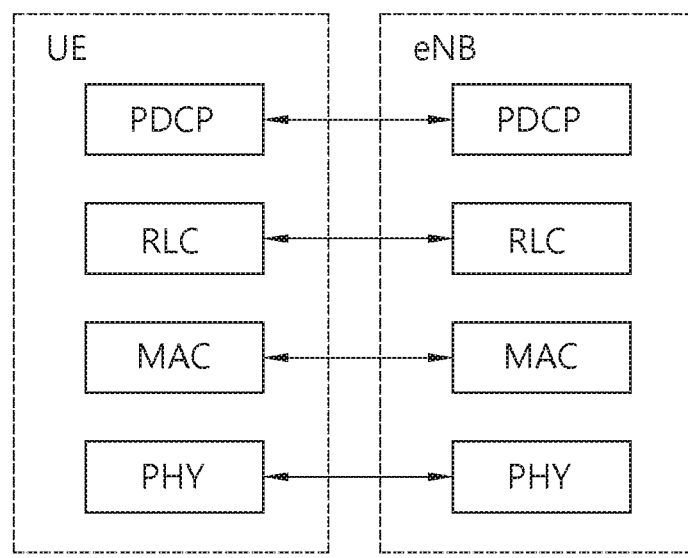
FIG. 2 is a block diagram illustrating a radio protocol architecture associated with a user plane, according to one or more exemplary embodiments.
Figure 3:
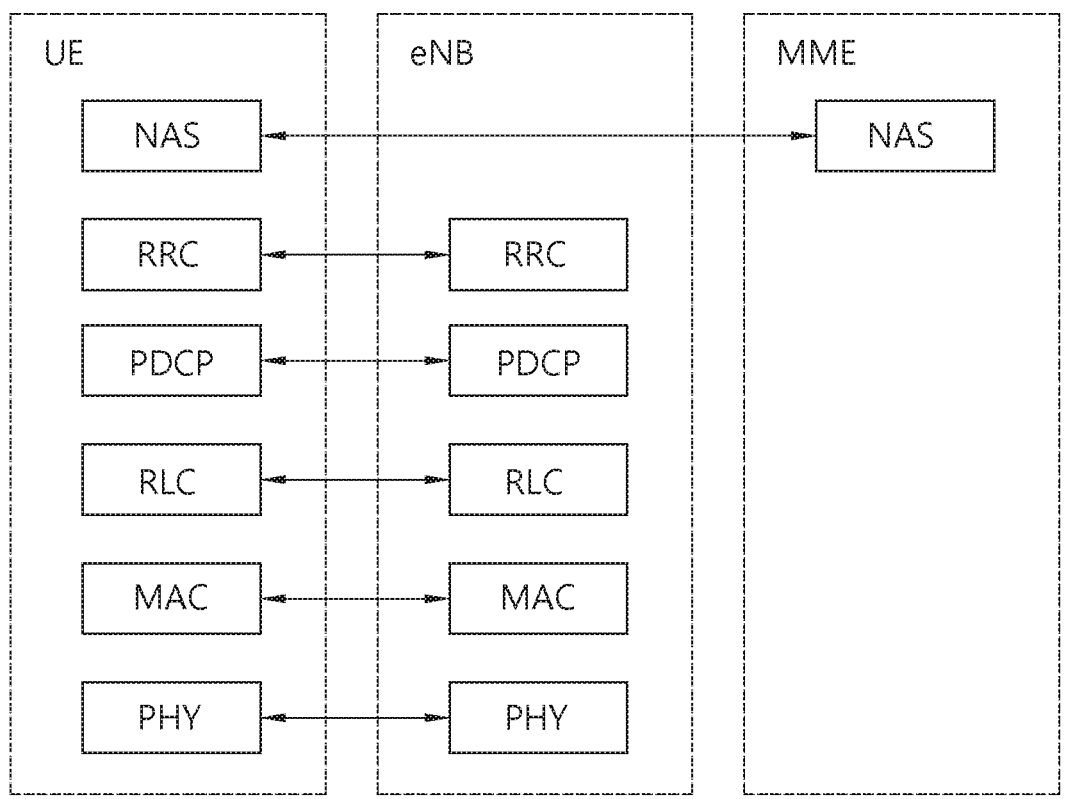
FIG. 3 is a block diagram illustrating a radio protocol architecture associated with a control plane, according to one or more exemplary embodiments.

FIG. 2 is a block diagram illustrating a radio protocol architecture associated with a user plane, according to one or more exemplary embodiments. FIG. 3 is a block diagram illustrating a radio protocol architecture associated with a control plane, according to one or more exemplary embodiments. The user plane indicates a protocol stack for user data transmission, and the control plane indicates a protocol stack for control signal transmission.

Referring to FIGS. 2 and 3, each Physical (PHY) layer of a UE and an eNB provides an information transfer service to a higher layer using a physical channel. The physical layer is connected to a Media Access Control layer which is a higher layer, through a transport cannel. Data is transferred through a transport channel between the MAC layer and the physical layer. The transport channel is classified based on a scheme of transmitting data through a radio interface. In addition, data is transferred through a physical channel between different physical layers (that is, between physical layers of a UE and an eNB). The physical channel may be modulated based on an Orthogonal Frequency Division Multiplexing (OFDM) scheme, and uses a space formed of time and frequencies, and a space formed of a plurality of antennas as radio resources.

For example, a Physical Downlink Control CHannel (PDCCH) among physical channels may inform a UE of resource allocation of a Paging CHannel (PCH) and a DownLink Shared CHannel (DL-SCH) and Hybrid Automatic Repeat Request (HARQ) information associated with a DL-SCH, and may deliver, to a UE, uplink scheduling grant which reports resource allocation of uplink transmission. A Physical Control Format Indicator CHannel (PCFICH) informs a UE of the number of OFDM symbols used for PDCCHs, and is transmitted for each subframe. A Physical Hybrid ARQ Indicator CHannel (PHICH) carries a HARQ ACK/NACK signal as a response to uplink transmission. In addition, a Physical Uplink Control CHannel (PUCCH) delivers HARQ ACK/NACK with respect to downlink transmission and uplink control information such as a scheduling request and a Channel Quality Indicator (CQI). A Physical Uplink Shared CHannel (PUSCH) delivers an UpLink Shared CHannel (UL-SCH). The PUSCH may include HARQ ACK/NACK and Channel State Information (CSI) such as a CQI.

The MAC layer may execute mapping between a logical channel and a transport channel, and execute multiplexing or demultiplexing between a transport channel of a MAC Service Data Unit (SDU) that belongs to the logical channel and a transport block provided in a physical channel. The MAC layer provides services to a Radio Link Control (RLC) layer through the logical channel. The logical channel is classified into a control channel for transferring control area information and a traffic channel for transferring user area information. For example, services provided from the MAC layer to a higher layer include data transmission or radio resource allocation.

The functions of the RLC layer include concatenation, segmentation, and reassembly of an RLC SDU. The RLC layer provides three types of operation modes, such as, a Transparent Mode (TM), an Unacknowledged Mode (UM) and an Acknowledged Mode (AM), to secure various Quality of Services (QoS) required by a Radio Bearer (RB).

Generally, the TM is used for setting an initial connection. The UM is for real time data transmission such as data streaming or a Voice over Internet Protocol (VoIP), which places importance on speed rather than the reliability of data. However, the AM is a mode that places importance on the reliability of data rather than speed, and is appropriate for high capacity data transmission or data transmission which is less sensitive to transmission delay. An eNB determines the mode of an RLC in an RB corresponding to each EPS bearer, based on QoS information of a corresponding EPS bearer that has a connection with a UE, and configures parameters in an RLC to satisfy QoS.

RLC SDUs are provided in various sizes, and for example, may be provided based on a byte unit. RLC Protocol Data Units (PDUs) may be defined only when a transmission opportunity is reported from a lower layer (for example, a MAC layer), and is transferred to a lower layer. The transmission opportunity may be reported together with the total size of RLC PDUs to be transmitted. Alternatively, the transmission opportunity and the total size of RLC PDUs to be transmitted may be separately reported.

The function of a Packet Data Convergence Protocol (PDCP) layer in the user plane includes user data transmission, header compression, and ciphering, and control plane data transmission and ciphering/integrity protection.

Referring to FIG. 3, a RRC layer controls a logical channel, a transport channel, and a physical channel, in association with configuration, reconfiguration, and release of RBs. An RB indicates a logical path provided by a first layer (PHY layer) and a second layer (MAC layer, RLC layer, and PDCP layer), for transferring data between a UE and a network. A process of configuring an RB indicates a process that defines properties of radio protocol layer and a channel for providing a predetermined service, and sets corresponding detailed parameters and an operation method. An RB may be classified into a Signaling RB (SRB) and a Data RB (DRB). The SRB is used as a path for transmitting an RRC message and a Non-Access Stratum (NAS) message in the control plane, and the DRB is used as a path for transmitting user data in the user plane.

A Non-Access Stratum (NAS) layer located in the upper portion of the RRC layer executes functions such as session management, mobility management, and the like. When an RRC connection exists between the RRC layer of a UE and the RRC layer of an E-UTRAN, the UE is in an RRC connected state, and otherwise, the UE is in an RRC idle state.

Resources need to be allocated to various paths among mobile communication network entities existing between a UE and an external Internet network, to enable the UE to transmit user data (for example, an IP packet) to the external network or to receive user data from the external network. As described above, a path that is capable of executing data transmission and reception through resources allocated between mobile communication network entities, is referred to as a bearer.

Figure 4:
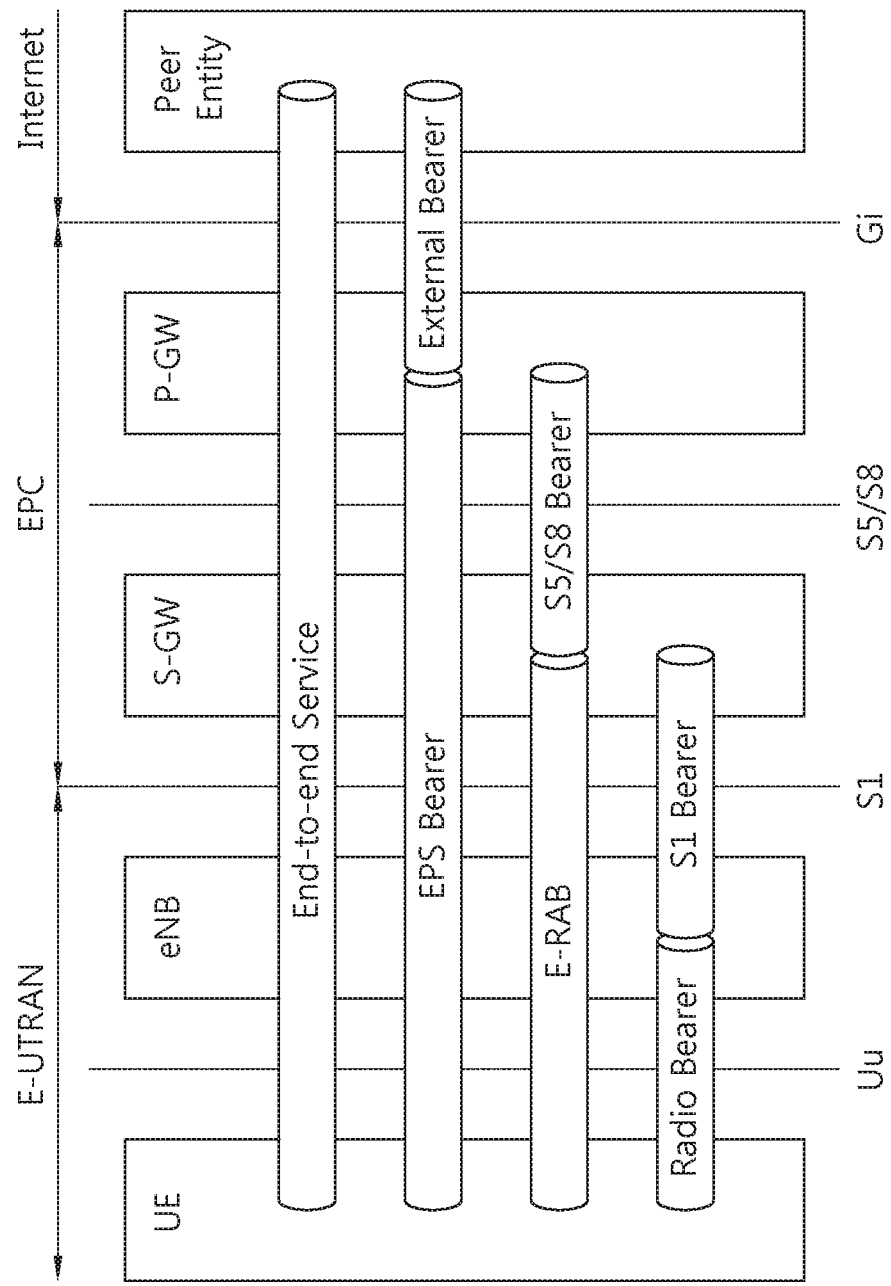
FIG. 4 is a diagram illustrating the architecture of a bearer service in a wireless communication system, according to one or more exemplary embodiments.

FIG. 4 is a diagram illustrating a structure of a bearer service in a wireless communication system, according to one or more exemplary embodiments.

In FIG. 4, a path for providing an End-to-End service between a UE and an internet network is illustrated. Here, the End-to-End service refers to a service that requires a path between a UE and a P-GW (an EPS bearer) and a path between the P-GW and the external internet network (an external bearer) for a data service between the UE and the internet network. The external path may be the bearer between the P-GW and the internet network.

In order to transmit data from a UE to an external internet network, the UE transmits data to a base station (eNB) via an RB. Then, the base station transmits the data received from the UE to an S-GW via an S1 bearer. The S-GW transmits the data received from the base station to a P-GW via an S5/S8 bearer, and the P-GW transmits the data received from the S-GW to a destination in the external internet network via the external bearer.

Likewise, in order to transmit data from the external internet network to the UE, the data may be transmitted via the above mentioned bearers according to the reverse direction of the data transmission direction from the UE to the external internet network described above.

As described above, different bearers may be defined for each interface in a wireless communication system, thereby ensuring independence between interfaces. Hereinafter, bearers of each interface will be described in more detail.

The bearers provided by a wireless communication system may be referred to as an EPS bearer. The EPS bearer may be a path configured between a UE and a P-GW for transmitting an IP traffic with a specific QoS. The P-GW may receive an IP flow from an internet network or transmit an IP flow to the internet network. Each EPS bearer may be configured by QoS determination parameters, which indicate a characteristic of a transport path. One or more EPS bearers may be configured for a UE, and one EPS bearer may indicate one E-UTRAN Radio Access Bearer (E-RAB) and one concatenation of an S5/S8 bearer.

An RB exists between a UE and a base station and transmits a packet of an EPS bearer. A specific RB has one-on-one mapping relationship with a corresponding EPS bearer/E-RAB.

An S1 bearer, which is a bearer that exists between an S-GW and a base station, transmits a packet of an E-RAB.

An S5/S8 bearer is a bearer of an S5/S8 interface. S5 and S8 bearers are bearers that exist for interfaces between S-GW and P-GW. An S5 interface exists if the S-GW and the P-GW belong to the same service provider, and an S8 interface exists if the S-GW belongs to a service provider of a roaming service (a visited Public Land Mobile Network (PLMN)) and the P-GW belongs to a subscribed service provider (a Home PLMN).

An E-RAB indicates an S bearer and a concatenation of a corresponding RB. If an E-RAB exists, a mapping relationship exists between the E-RAB and one EPS bearer. More specifically, one EPS bearer corresponds to one RB, one S1 bearer, or one S5/S8 bearer. An S1 bearer is a bearer for an interface between a base station and an S-GW.

As described above, an RB includes a data RB (DRB) and a signaling RB (SRB). However, a DRB provided by Uu interface for supporting a user service may be referred to as an RB throughout the description. Accordingly, an RB as the DRB needs to be distinguished from the SRB. An RB is a path through which user plane data is delivered, and an SRB is a path through which control plane data, such control messages of RRC layer and NAS, is delivered. One-on-one mapping relationship exists between an RB/E-RAB and an EPS bearer. In order to generate a DRB that couples an uplink and a downlink, a base station performs one-on-one mapping between the DRB and an S bearer and stores the mapping result. In order to generate an S1 bearer and an S5/S8 bearer that couple an uplink and a downlink, a S-GW performs one-on-one mapping between the S1 bearer and the S5/S8 bearer and stores the mapping result.

Types of EPS bearers include a default bearer and a dedicated bearer. If a UE accesses a wireless communication network, the UE is assigned with an IP address, a PDN connection is established and a default EPS bearer is generated for the UE. The default bearer is generated newly if a new PDN connection is established. If a user starts to use a service in which a QoS is not ensured by a default bearer, e.g., a VoD service, while the user is using a service (e.g., an internet, etc.) through the default bearer, a dedicated bearer is generated as an on-demand. The dedicated bearer may be configured with different QoS from a QoS configured for an existing bearer. The QoS determination parameters for the dedicated bearer may be provided by a Policy and Charging Rule Function (PCRF). In order to generate a dedicated bearer, the PCRF may determine QoS determination parameters by receiving subscription information of a user from a Subscriber Profile Repository (SPR). For example, the maximum number of generated dedicated bearer may be 15, and 4 bearers among the 15 dedicated bearers are not used in an LTE system. Accordingly, the maximum number of generated dedicated bearer may be 11 in an LTE system.

An EPS bearer includes QoS Class Identifier (QCI) and Allocation and Retention Priority (ARP) as basic QoS determination parameters. EPS bearers may be classified into a Guaranteed Bit Rate (GBR)-type bearer and a non-GBR-type bearer according to a QCI resource type. A default bearer is configured as a non-GBR-type bearer, and a dedicated bearer may be configured as a GBR-type bearer or a non-GBR-type bearer. A GBR-type bearer has GBR and Maximum Bit Rate (MBR) as QoS determination parameters in addition to the QCI and ARP. After determining a QoS requirement of a wireless communication system as an EPS bearer, a specific QoS is determined for each interface. Each interface configures a bearer according to its own QoS requirement.

Figure 5:
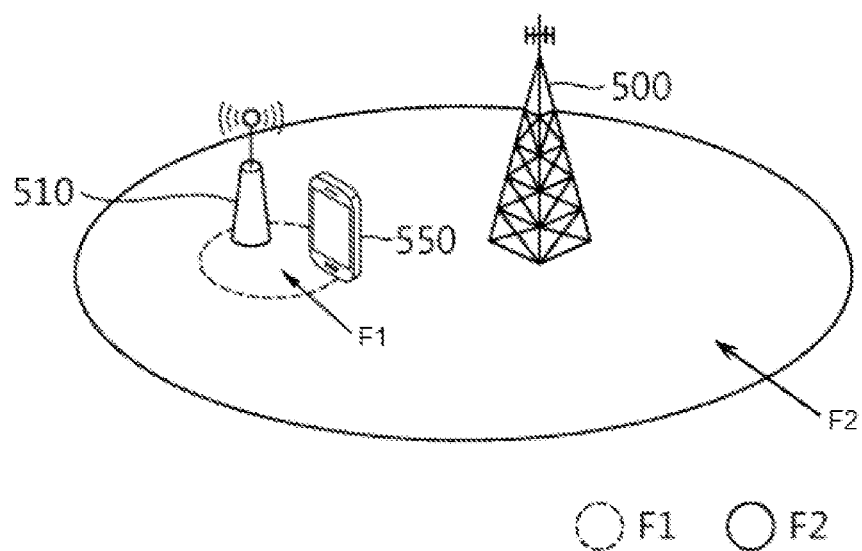
FIG. 5 is a diagram illustrating an example of a dual connectivity situation of a User Equipment (UE), according to one or more exemplary embodiments.

FIG. 5 is a diagram illustrating of dual connectivity for a user equipment, according to one or more exemplary embodiments.

As an example, FIG. 5 illustrates a case in which a UE 550 enters an overlapped area of a service area of a macro cell F2 of a master base station 500 and a service area of a small cell F1 of a secondary base station 510.

In this case, in order to support additional data services through the small cell F1 of the secondary base station 510 while maintaining an existing radio connection and a data service connection through the macro cell F2 of the master base station 400, the network configures a dual connectivity to the UE 550. Accordingly, user data arrived in the master base station 500 may be transmitted to the UE 550 through the secondary base station 510. More specifically, a frequency band of F2 is allocated to the master base station 500, and the frequency band of F1 is allocated to the secondary base station 510. The UE 550 may receive a service via the frequency band of the F1 from the secondary base station 510 while receiving a service via the frequency band of the F2 from the master base station 500. As described above, the master base station 500 utilizes the frequency band of the F2 and the secondary base station 510 utilizes the frequency band of the F1, but aspects of the present invention are not limited as such. Both the master base station 500 and the secondary base station 510 may utilized the same frequency band of the F1 or the F2.

Figure 6:
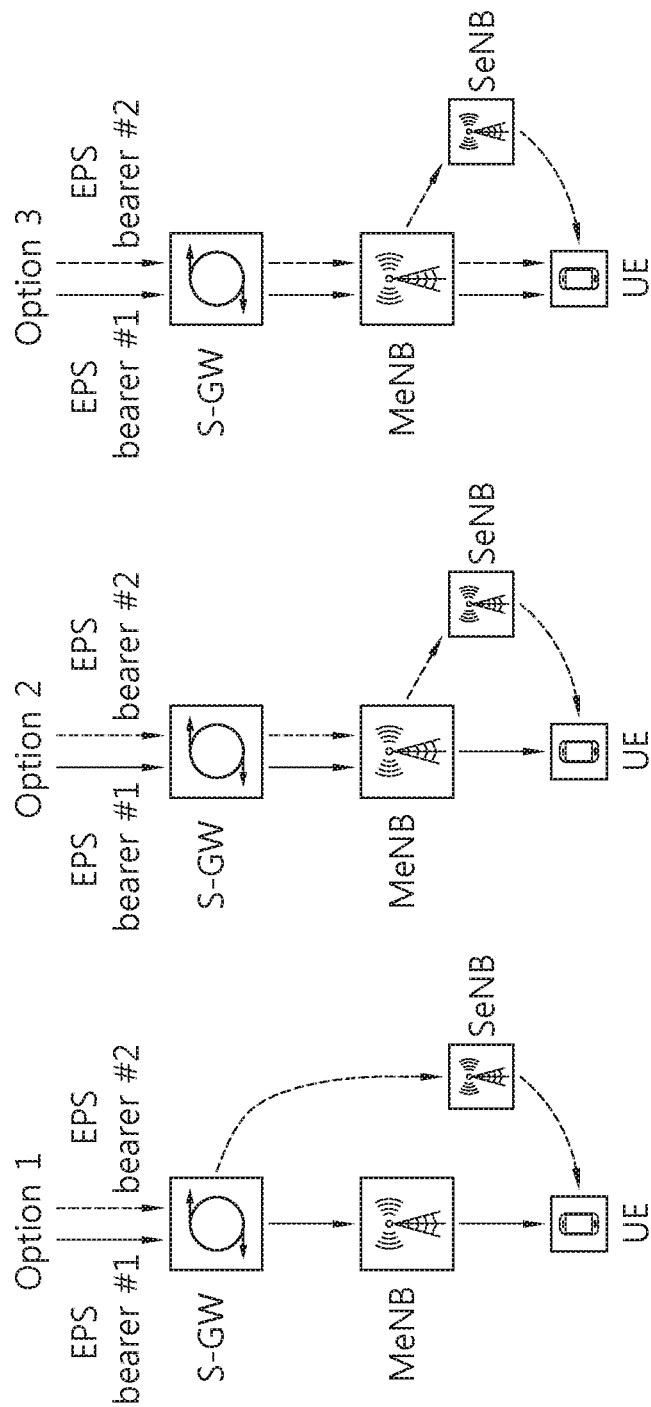
FIG. 6 is a diagram illustrating the architecture of a user plane for dual connectivity, according to one or more exemplary embodiments.

FIG. 6 is a diagram illustrating a user plane structure for dual connectivity, according to one or more exemplary embodiments.

A UE, a master evolved NodeB (MeNB), and at least one secondary evolved NodeB (SeNB) may configure for dual connectivity. As shown in FIG. 6, there may be three options for a dual connectivity in accordance with a division scheme of user plane data. As an example, FIG. 6 illustrates concepts of the three different options with respect to a downlink transmission of user plane data.

OPTION 1: The S1-U interface has a master base station and a secondary base station as terminal nodes. In this option, each base station (MeNB and SeNB each) transmits downlink data via an EPS bearer configured for a UE (EPS bearer #1 for the MeNB, EPS bearer #2 for the SeNB). Since use plane data splits at a Core Network (CN), this option may be referred to as "CN split".

OPTION 2: The S1-U interface has only master base station as a terminal node. In this option, although the S1-U interface has only master base station as a terminal node, each base station is mapped with one bearer without splitting the bearers.

OPTION 3: The S1-U interface has only master base station as a terminal node. In this option, since a bearer splits, this may be referred to as "bearer split". According to the "bearer split" scheme, since one bearer splits into a plurality of base stations, data is divided into two or more flows and transmitted. Since data is delivered through a plurality of flows, the "bearer split" scheme may be referred to as a multi flow, multiple nodes (eNB) transmission, inter-eNB carrier aggregation, and the like.

With respect to a protocol structure, if the S1-U interface has only master base station as a terminal node (that is, in the case of OPTION 2 or OPTION 3), a protocol layer in a secondary base station may be required to support a segmentation or re-segmentation process. This is because a physical interface and the segmentation process are closely related and, a segmentation or re-segmentation process needs to correspond to the node transmitting RLC PDUs when a non-ideal backhaul is used. Accordingly, protocol structures for dual connectivity on the RLC layer or an upper layer may be variously configured as the types described below, for example.

A. Type 1: a configuration in which PDCP layers are independently exist in each base station: This configuration may be referred to as an independent PDCP type. In this configuration, each base station may utilize the existing LTE layer 2 protocol operations in a bearer. This configuration may be utilized in the above described OPTION 1, OPTION 2, and OPTION 3.

B. Type 2: a configuration in which RLC layers are independently exist in each base station: This configuration may be referred to as an independent RLC type. In this configuration, the S1-U interface has only master base station as a terminal node, and a PDCP layer exist in the master base station only. In the "bearer split" (OPTION 3) scheme, a network and a UE has a separated RLC layer, and each RLC layer has an independent RLC bearer.

C. Type 3: a configuration in which an RLC layer includes a 'master RLC layer' in a master base station and a 'slave RLC layer' in a secondary base station. This configuration may be referred to as a master-slave RLC type. In this configuration, the S1-U interface has only master base station as a terminal node. The master base station includes a PDCP layer and a part of an RLC layer (the master RLC layer), and a secondary base station includes another part of the RLC layer (the slave RLC layer). A UE includes one RLC layer that is paired with the master RLC layer and the slave RLC layer.

Figure 7:
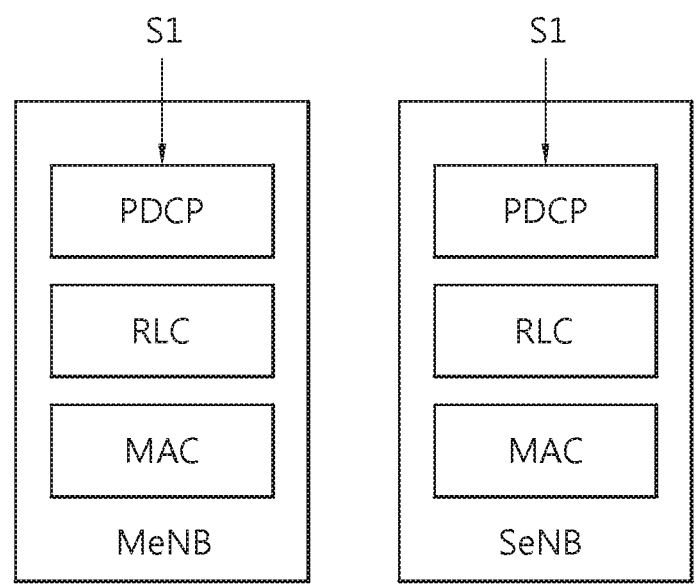
FIG. 7 and FIG. 8 are diagrams illustrating examples of a protocol architecture of evolved NodeBs (eNBs) during downlink transmission of user plane data in dual connectivity, according to one or more exemplary embodiments.
Figure 8:
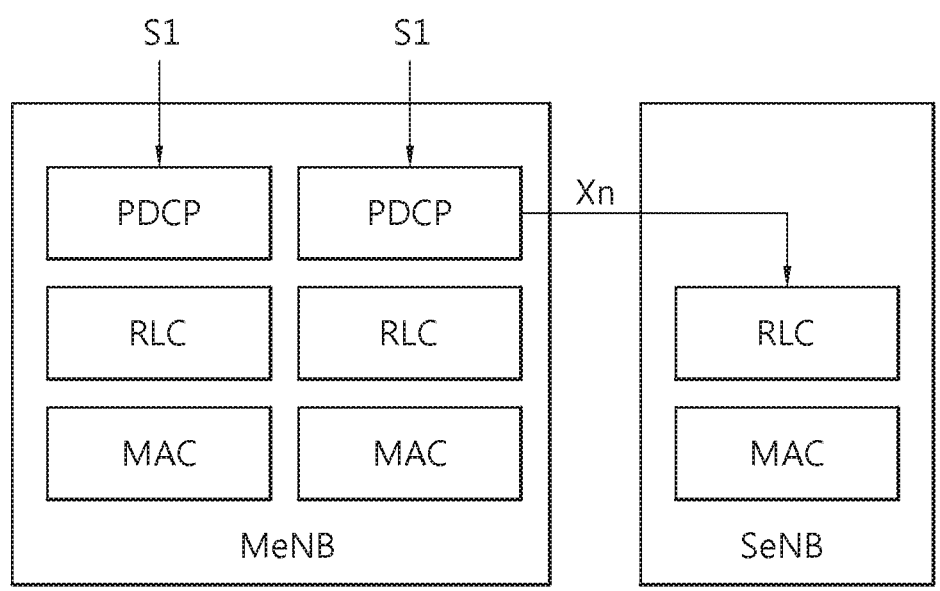

Accordingly, the dual connectivity configurations may vary in accordance with different combinations of the above mentioned options and types as following FIG. 7 and/or FIG. 8.

FIG. 7 and FIG. 8 are diagrams illustrating protocol structures of base stations in the case of downlink data transmission for a user plane, according to one or more exemplary embodiments.

Referring to FIG. 7, the S1-U interface has a master base station and a secondary base station as terminal nodes, and each base station has an independent PDCP layer (the independent PDCP type). In this configuration, each of the master base station and the secondary base station includes a PDCP layer, an RLC layer, and a MAC layer, and each base station transmits downlink data via the respective EPS bearer configured for a UE. Such a structure may be referred to as a dual connectivity mode 1A.

In this configuration, it may not be necessary for a master base station to buffer or process packets delivered by a secondary base station, and there may be an advantage that there is no, or insignificant, impact on RDCP/RLC and GTP-U/UDP/IP Furthermore, there may be fewer requirements between backhaul link of a master base station and a secondary base station. There may be an advantage that a secondary base station can support local break-out and content caching for a UE connected by a dual connectivity function and a master base station does not need to route all traffics because a flow between a master base station and a secondary base station does not need to be controlled.

Referring to FIG. 8, the S1-U interface has only a master base station as terminal nodes, a bearer split is not performed, and PDCP layers independently exist in each base station (the independent PDCP type). In this case, PDCP layers, RLC layers, and MAC layers exist in a master base station, and secondary base station may include an RLC layer and a MAC layer without having a PDCP layer. The PDCP layers, the RLC layers, and the MAC layers in the master base station may be divided into bearer levels, respectively, and one of the PDCP layers may be connected to an RLC layer of the master base station and may be connected an RLC layer of the secondary base station through Xn (or X2) interface. Such a structure may be referred to as a dual connectivity mode 3C.

Such case has the merit of the mobility of the secondary base station being hidden in the core network, has insignificant or no effect on a security issue for the master base station to require an encryption, and has the merit of eliminating the need of data forwarding between secondary base stations when a secondary base station needs to be changed. Further, the structure enables the master base station to assign an RLC processing to the secondary base station in the dual connectivity configuration, has insignificant or no effect on RLC, and enables radio resources being utilized through the master base station and the secondary base station with respect to the same bearer when possible. Also, it has the merit of relatively lenient mobility requirements for the secondary base station because it enables the use of mater base station during the movement between secondary base stations.

Figure 9:
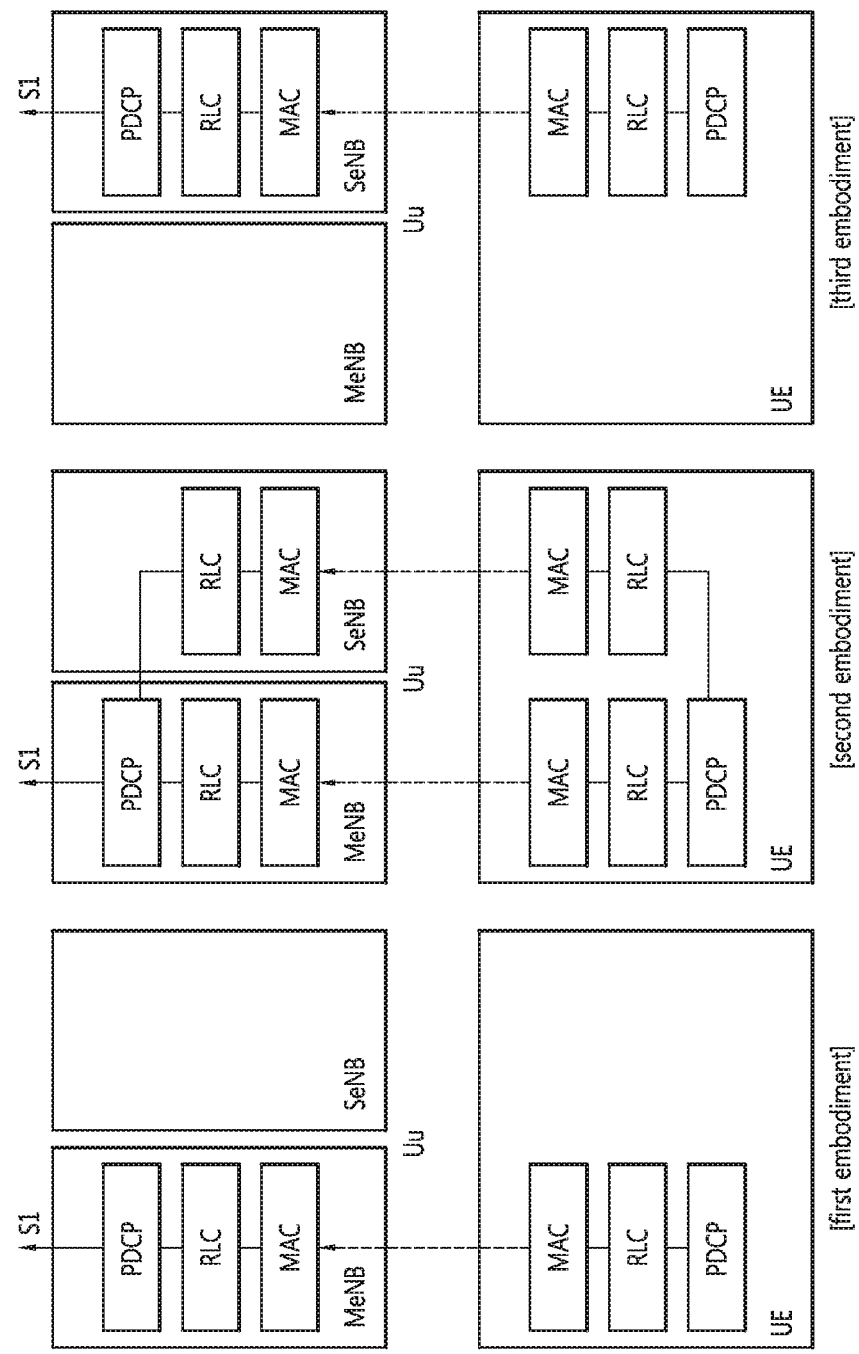
FIG. 9 is a diagram illustrating an example of a Media Access Control (MAC) entity architecture corresponding to the protocol architecture of FIG. 7 and FIG. 8, according to one or more exemplary embodiments.

FIG. 9 is a diagram illustrating an example of a Media Access Control (MAC) entity architecture corresponding to the protocol architectures of FIG. 7 and FIG. 8, according to one or more exemplary embodiments. Operations of a UE may be defined based on the MAC entity architecture for uplink transmission of the UE of FIG. 9.

Referring to FIG. 9, a first embodiment shows that a MAC entity is configured in only a bearer for a Master eNB (MeNB). The first embodiment may be applied to all the protocol architectures of FIGS. 7 and 8, in association with an uplink. A second embodiment shows that a MAC entity is configured in bearers for both a MeNB and a Secondary eNB (SeNB) (that is, bearer split), and may be applied to the protocol architecture of FIG. 8. A third embodiment shows that a MAC entity is configured in only a bearer for a SeNB, and may be applied to the protocol architecture of FIG. 7.

Figure 10:
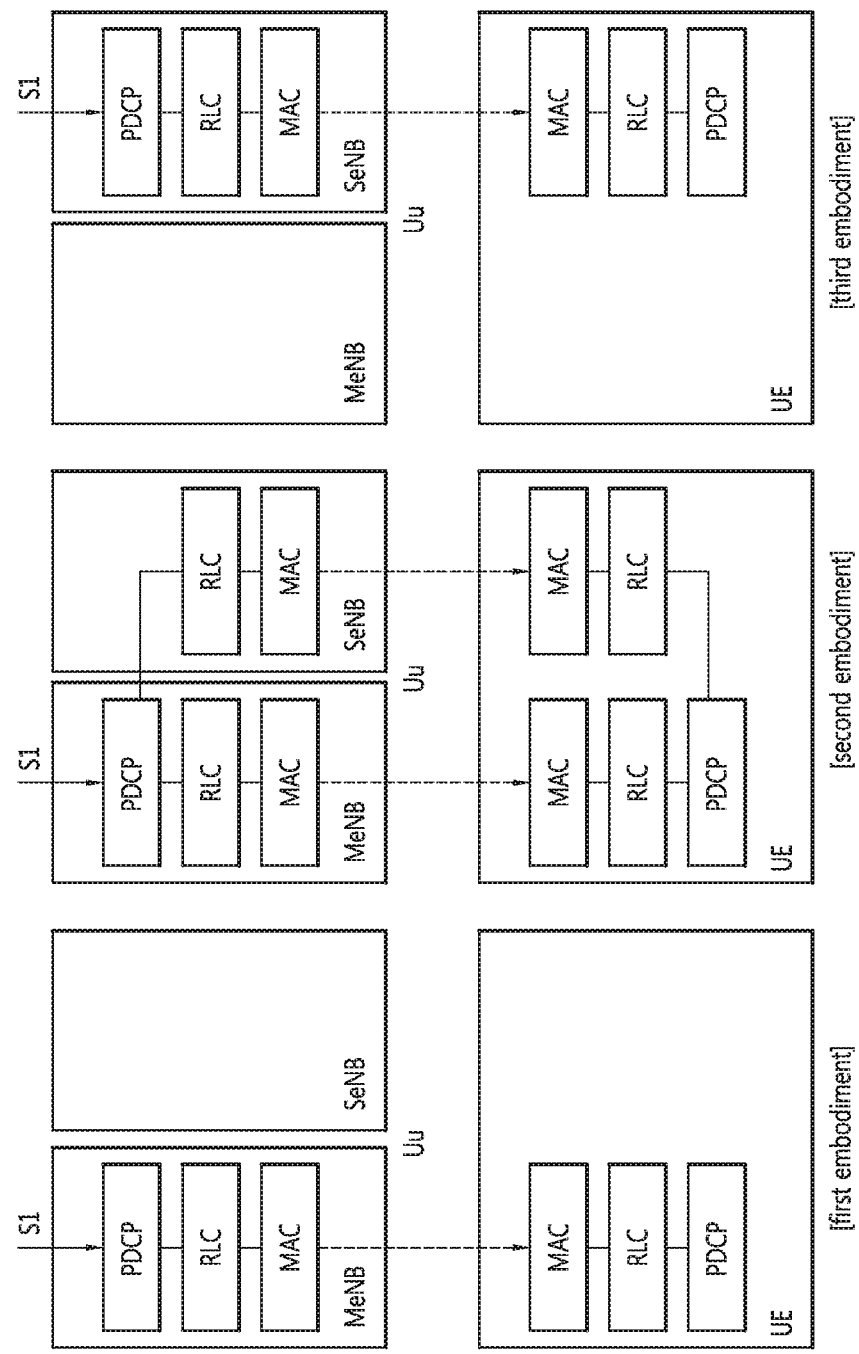
FIG. 10 is a diagram illustrating another example of a MAC entity architecture corresponding to the protocol architecture of FIG. 7 and FIG. 8, according to one or more exemplary embodiments.

FIG. 10 is a diagram illustrating another example of a MAC entity architecture corresponding to the protocol architectures of FIG. 7 and FIG. 8, according to one or more exemplary embodiments. Operations of a UE may be defined based on the MAC entity architecture for downlink transmission to the UE of FIG. 10.

Referring to FIG. 10, a first embodiment shows that a MAC entity is configured in only a bearer for a MeNB. The first embodiment may be applied to the protocol architecture of FIG. 7, in association with a downlink. A second embodiment shows that a MAC entity is configured in bearers for both a MeNB and a Secondary eNB (SeNB) (that is, bearer split), and may be applied to the protocol architecture of FIG. 8. A third embodiment shows that a MAC entity is configured in only a bearer for a SeNB, and may be applied to the protocol architecture of FIG. 7.

Hereinafter, Carrier Aggregation (CA) will be described in more detail. The CA scheme is a technology to effectively use divided narrow bands, and the CA scheme may provide an effect that a base station uses a logically wide band by aggregating physically continuous or non-continuous bands in a frequency domain. The frequency bands used for the CA may be referred to as a Component Carrier (CC), respectively.

Component carriers may be classified into a Primary Component Carrier (PCC) and a Secondary Component Carrier (SCC). A UE may use only PCC or may use one or more SCCs along with the PCC. A UE may be assigned the PCC and/or SCC(s) from a base station.

When a CA is configured for a UE, the UE has one RRC connection with a network. This applies even when dual connectivity is configured for the UE. In a case where an RRC connection is established or re-established or a handover occurs, a specific serving cell may provide the UE with non-access stratum (NAS) mobility information (e.g., Tracking Area ID (TAI)). Hereinafter, the specific serving cell is referred to as a Primary serving Cell (PCell) and serving cells other than the PCell are referred to as Secondary serving Cells (SCells). For the PCell, a pair of Downlink Primary Component Carrier (DL PCC) and Uplink Primary Component Carrier (UL PCC).

According to UE capability, secondary serving cells may be configured, with the PCell, in a serving cell group. Only DL Secondary Component Carrier (DL SCC) may be configured for a secondary serving cell, only UL SCC may be configured for a secondary serving cell, or a pair of DL SCC and UL SCC may be configured for a secondary serving cell. The serving cell group may include one PCell and at least one SCell. PCell may be changed only thorough a handover procedure, and may be used for a Physical Uplink Control CHannel (PUCCH) transmission. Although PCell cannot be deactivated, an SCell may be changed to a deactivated state.

Addition/elimination/reconfiguration of a secondary serving cell may be performed through a dedicated signaling, an RRC connection reconfiguration procedure. If a new secondary serving cell is configured for a UE, system information of the new secondary serving cell may also be included in an RRC connection reconfiguration message and transmitted to the UE through the RRC connection reconfiguration procedure. Accordingly, a secondary serving cell does not need to monitor a change of system information.

Hereinafter, Power Headroom (PH) will be described.

The PH refers to residual power that a current UE may afford to utilize, in addition to power that the current UE currently uses for uplink transmission. For example, it is assumed that a maximum transmission power which is an uplink transmission power within a range allowed to a UE, is 10 W, and the UE currently consumes power of 9 W in a frequency band of 10 Mhz. In this instance, the UE may afford 1 W, additionally, and thus, the PH is 1 W.

Here, when an eNB allocates a frequency band of 20 Mhz to a UE, power of 18 W (=9 W 2) may be required. However, the maximum power of the UE is 10 W and thus, when 20 Mhz is allocated to the UE, the UE may fail to use the entire frequency band or the eNB may fail to receive a signal of the UE due to lack of power. To overcome the above drawbacks, the UE reports to the eNB that the PH is 1 W, so that the eNB executes scheduling within the range of PH. The report is referred to as a Power Headroom Report (PHR).

Through the PHR, 1) information associated with a difference between the nominal maximum transmission power of a UE for each activated serving cell and an estimated UL-SCH(PUSCH) transmission power, 2) information associated with a difference between the nominal maximum transmission power of a UE for a Primary serving cell (PCell) and a estimated PUCCH transmission power, or 3) information associated with a difference between the nominal maximum transmission power for a PCell and an estimated UL-SCH and PUCCH transmission power, may be transmitted to a serving eNB.

The PHR of a UE may be defined as two types (type 1 and type 2). The PH of a UE may be defined with respect to a subframe i for a serving cell c. Type 1 PH corresponds to 1) the case where a UE transmits only a PUSCH without a PUCCH, 2) the case where a UE simultaneously transmits a PUCCH and a PUSCH, and 3) the case where a PUSCH is not transmitted. Type 2 PH corresponds to 1) the case where a UE simultaneously transmits a PUCCH and a PUSCH, 2) the case where a UE transmits a PUSCH without a PUCCH, 3) the case where a UE transmits a PUCCH without a PUSCH, and 4) the case where a UE does not transmit a PUCCH or a PUSCH, with respect to a subframe i for a PCell.

When an extended PHR is not configured, only the type 1 PHR associated with the PCell is reported. Conversely, when the extended PHR is configured, the type 1 PH and the type 2 PH are reported to activated serving cells for which an uplink is configured, respectively.

PH reporting delay refers to a difference between a point where a PH reference section begins and a point where a UE beings transmission of a PH value through a wireless interface. The PH reporting delay needs to be 0 ms, and this may be applied to all triggering schemes configured for PHR.

The PHR may be controlled by a periodic PHR-timer (hereinafter, referred to as a periodic timer), and a prohibit PHR-timer. Triggering of the PHR in association with a change in a pathloss measured by a UE in a downlink and a change of a power management-based backoff required value (P-MPR), is controlled by transmitting dl-Pathloss-Change through an RRC message.

A reported PH is mapped as a predetermined index value, which is listed as shown in the following table.

TABLE 1

| Reported value | Measured quantity value (dB) |
| --- | --- |
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH = 40$ |

Referring to Table 1, the PH is included in the range from $-23$ dB to $+40$ dB. When 6 bits are used for expressing a PH, 64 (=$2^6$) indices are expressed, and thus, PHs may be classified into a total of 64 levels. For example, when a bit that expresses a PH is '0' ('000000' when expressed in 6 bits), this indicates that the level of the PH is '$-23 \leq P_{PH} \leq -22$ dB.'

The power limited case refers to the case where a required transmission power of a UE indicated by an eNB is higher than a maximum transmission power allowed for the UE while the UE executes uplink transmission, and the required transmission power is limited. In this instance, a PH value in a form of negative number may be reported.

Conversely, the non-power limited case refers to the case where a required transmission power of a UE indicated by an eNB is lower than a maximum transmission power allowed for the UE while the UE executes uplink transmission, and the required transmission power is not limited. In this instance, a PH value in a form of positive number may be reported.

Hereinafter, power scaling will be described. Power scaling refers to reduction of a transmission power based on a predetermined scale, so as to allocate power that does not exceed a total transmit power of a UE. An example of power scaling is multiplexing an original transmission power by a scaling factor. The power scaling may be variously expressed by power adjustment, power scaling, power control, or the like.

When a total transmit power of a UE exceeds, $\hat{P}_{CMAX}(i)$ the UE executes scaling with respect to $\hat{P}_{PUSCH,c}(i)$ of a subframe i for a serving cell c, as shown in Equation 1 provided below.

$$\sum_c w(i) \cdot \hat{P}_{PUSCH,c}(i) \le (\hat{P}_{CMAX}(i) - \hat{P}_{PUCCH}(i)) \quad \text{[Equation 1]}$$

Referring to Equation 1, $\hat{P}_{PUCCH}(i)$ is a linear value of $P_{PUCCH}(i)$, and $P_{PUCCH}(i)$ is a PUCCH transmission power in a subframe i. $\hat{P}_{PUSCH,c}(i)$ is a linear value of $P_{PUSCH,c}(i)$ that is a PUSCH transmission power for a serving cell c in a subframe i, $\hat{P}_{CMAX}(i)$ is a linear value of a total configured maximum output power (or maximum transmission power) $P_{CMAX}$, configured for a UE in a subframe i, and w(i) denotes a scaling factor of $\hat{P}_{PUSCH,c}(i)$ for a serving cell c, and has a value from 0 to 1. When a PHCCH transmission does not exist in the subframe i, $\hat{P}_{PUCCH}(i)=0$.

When a UE has a PUSCH transmission with Uplink Control Information (UCI) in a serving cell j, has a PUSCH transmission without UCI in any of the remaining serving cells, and the total transmit power of the UE exceeds $\hat{P}_{CMAX}(i)$, the UE may execute scaling of $\hat{P}_{PUSCH,c}(i)$ with respect to serving cells that carry a PUSCH without UCI of a subframe i, as shown in Equation 2 provided below.

$$\sum_{c \ne j} w(i) \cdot \hat{P}_{PUSCH,c}(i) \le (\hat{P}_{CMAX}(i) - \hat{P}_{PUSCH,j}(i)) \quad \text{[Equation 2]}$$

Here, $\hat{P}_{PUSCH,j}(i)$ is a linear value of a PUSCH transmission power with respect to a cell with UCI, and w(i) denotes a scaling factor of $\hat{P}_{PUSCH,c}(i)$ with respect to a serving cell c without UCI. In this instance, when $$\sum_{c \ne j} w(i) \cdot \hat{P}_{PUSCH,c}(i) = 0$$

is not satisfied, a total transmit power of the UE does not exceed $\hat{P}_{CMAX}(i)$, power scaling is not applied to $\hat{P}_{PUSCH,j}(i)$.

When w(i) is greater than 0, w(i) is equal with respect to serving cells. In this instance, however, w(i) may be 0 with respect to predetermined serving cells.

When a UE simultaneously transmits a PUCCH and a PUSCH with UCI in a serving cell j, transmits a PUSCH without UCI in any of the remaining serving cells, and a total transmit power of the UE exceeds $\hat{P}_{CMAX}(i)$, the UE may obtain $\hat{P}_{PUSCH,c}(i)$ as shown in Equation 3 provided below.

$$\hat{P}_{PUSCH,j}(i) = \min(\hat{P}_{PUSCH,j}(i), (\hat{P}_{CMAX}(i) - \hat{P}_{PUCCH}(i))) \quad \text{[Equation 3]}$$

$$\sum_{c \ne j} w(i) \cdot \hat{P}_{PUSCH,c}(i) \le (\hat{P}_{CMAX}(i) - \hat{P}_{PUCCH}(i) - \hat{P}_{PUSCH,j}(i))$$

When a UE that supports CA executes communication with a plurality of eNBs based on dual connectivity, a plurality of aggregated serving cells may be provided through different eNBs. Among serving cells configured for a UE, a serving cell group that is provided by a MeNB is referred to as a Master Cell Group (MCG), and a serving cell group that is provided by the SeNB is referred to as a Secondary Cell Group (SCG). For example, it is assumed that a PCell, a first SCell, and a second SCell are configured for a UE through the CA. In the dual connectivity situation, the PCell and the first SCell may be included in the MCG provided by the MeNB, and the second SCell may be included in the SCG provided by the SeNB.

For the UE having dual connectivity, the MeNB and the SeNB may execute independent scheduling with respect to the UE. That is, the UE having dual connectivity, may be connected to at least two eNBs having independent schedulers, and transmit and receive data. In this instance, the MCG and the SCG may operate based on QoSs independent from one another.

Each of the MCG and the SCG may have a serving cell for executing at least one PUCCH transmission, so as to effectively report a HARQ ACK/NACK. For example, a PUCCH may be transmitted in both a PCell included in the MCG and a predetermined small cell included in the SCG. That is, in some cases, a UE may execute simultaneous PUCCH transmission on two serving cells, in a single subframe. Therefore, the characteristics of dual connectivity should be taken into consideration, to execute transmission power control (and power scaling) for a UE. In addition, transmission of a PRACH, a PUSCH, a Sounding Reference Signal (SRS), a Demodulation Reference Signal (DMRS), and the like, based on dual connectivity, should be taken into account.

Accordingly, the present invention provides a transmission power controlling method for a UE by taking into consideration dual connectivity. Particularly, in the case where power of a UE for which dual connectivity is configured, is limited (for example, the case where a total transmit power of the UE exceeds $\hat{P}_{CMAX}(i)$), a power control (and scaling) method for a UE to execute uplink transmission to a plurality of eNBs through a plurality of uplink channels in a single subframe, is provided.

Various methods may be used to execute PUSCH/PUCCH power control (and scheduling) for a UE for which dual connectivity is configured under power limited case, and the methods may be classified based on the number of cell groups through which a PUSCH that carries UCI is transmitted in a single subframe, as follows. (1) For example, a PUSCH transmission with UCI does not exist in a corresponding subframe (hereinafter referred to as Case 1). (2) As another example, a PUSCH transmission with UCI in a corresponding subframe exists in only a single cell group (hereinafter referred to as Case 2). (3) As another example, a PUSCH transmission with UCI in a corresponding subframe exists in all cell groups (hereinafter referred to as Case 3). In the above examples, a PUCCH(s) and a PUSCH(s) without UCI may or may not be transmitted.

Table 2 lists examples of the cases where PUSCH/PUCCH power control (and scaling), which is classified based on the number of cell groups where a PUSCH that carries UCI is transmitted, is applied.

The example 1' and the example 2' are modulated from the example 1 and the example 2, respectively, so that the

TABLE 2

| | MeNB | | | | SeNB | | | |
|---|---|---|---|---|---|---|---|---|
| PUCCH | PUSCH w/ UCI | PUSCH w/o UCI#0 | PUSCH w/o UCI#1 | PUCCH | PUSCH w/ UCI | PUSCH w/o UCI#0 | PUSCH w/o UCI#1 | case |
| O* | | O | O* | O* | | | | case 1 |
| O* | | | | O* | | O | O* | |
| O* | | O | O* | O* | | O | O* | |
| O* | O | O* | O* | O* | | O* | O* | case2 |
| O* | | O* | O* | O* | O | O* | O* | |
| O* | O | O* | O* | O* | O | O* | O* | case3 |

*denotes a channel that may or may not be transmitted

Referring to Table 2, O denotes a channel that is transmitted in an uplink, and O* denotes a channel that may or may not be transmitted. PUSCH w/UCI denotes a PUSCH with UCI, and PUSCH w/o UCI # n denotes a PUSCH without UCI. PUSCH w/o UCI #0 indicates that a PUSCH without UCI is transmitted in a serving cell of a corresponding cell group, and PUSCH w/o UCI #1 may indicate that a PUSCH without UCI is transmitted in another serving cell of the corresponding cell group.

For example, referring to Case 3, a PUSCH with UCI (PUSCH w/UCI) is transmitted to each of an MeNB and an SeNB, and the remaining PUCCH and PUSCH (PUSCH w/o UCI # n) may or may not be transmitted.

When power control (and scaling) is executed, a power allocation priority is defined and power control (and scaling) may be executed based on the priority. When dual connectivity is configured for a UE, the priority in the power limited case may be listed as follows.

TABLE 3

| | Priority |
|---|---|
| Example Priority 1 | PUCCHs > PUSCH w/UCI for MCG > PUSCH w/UCI for SCG > PUSCH w/o UCI for MCG > PUSCH w/o UCI for SCG |
| Example Priority 1' | PUCCHs > PUSCH w/UCI for MCG > PUSCH w/UCI for SCG > PUSCH w/o UCI for MCG = PUSCH w/o UCI for SCG |
| Example Priority 2 | PUCCHs > PUSCH w/UCI for MCG = PUSCH w/UCI for SCG > PUSCH w/o UCI for MCG > PUSCH w/o UCI for SCG |
| Example Priority 2' | PUCCHs > PUSCH w/UCI for MCG = PUSCH w/UCI for SCG > PUSCH w/o UCI for MCG = PUSCH w/o UCI for SCG |
| Example Priority 3 | PUCCHs > PUSCH w/UCI for MCG > PUSCH w/UCI for SCG > PUSCH w/o UCI for a cell group with Higher QoS > PUSCH w/o UCI for a cell group with lower QoS |
| Example Priority 4 | PUCCHs > PUSCH w/UCI for MCG = PUSCH w/UCI for SCG > PUSCH w/o UCI for a cell group with Higher QoS > PUSCH w/o UCI for a cell group with lower QoS |

In Table 3, referring to the example 1, PUCCH power is allocated preferentially, and a PUSCH with UCI of an MCG, a PUSCH with UCI of an SCG, a PUSCH without UCI of the MCG, and a PUSCH without UCI of the SCG are allocated sequentially.

Referring to the example 2, PUCCH power is allocated preferentially, a PUSCH with UCI of the MCG and a PUSCH with UCI of the SCG are allocated subsequently, a PUSCH without UCI of the MCG is allocated subsequently, and a PUSCH without UCI of the SCG is allocated subsequently.

PUSCH without UCI of the MCG and the PUSCH without UCI of the SCG have an identical priority.

Referring to the example 3, PUCCH power is allocated preferentially, and a PUSCH with UCI of the MCG, a PUSCH with UCI of the SCG, a cell group having the highest QoS from among the MCG and the SCG, a cell group having the lowest QoS from among the MCG and the SCG, are allocated sequentially.

Referring to the example 4, PUCCH power is allocated preferentially, a PUSCH with UCI of the MCG and a PUSCH with UCI of the SCG are allocated subsequently, a cell group having the highest QoS from among the MCG and the SCG is allocated subsequently, and a cell group having the lowest QoS from among the MCG and the SCG is allocated subsequently.

As described in the example 3 and the example 4, when the priority for PUSCH power scaling is determined based on a QoS, a first layer (L1) is not aware of a QoS value and thus, may receive corresponding information from a higher layer. For example, a physical layer of a UE may receive an indication of a QoS value associated with the MCG and the SCG, from an RRC layer or a MAC layer.

Although descriptions are provided based on a PUSCH in the examples, a PUCCH of the MCG may have a higher priority between the PUCCH of the MCG and a PUCCH of the SCG, and the priority of a PUCCH for a predetermined cell group may be higher than the priority of a PUCCH for another cell group, based on characteristics of UCI transmitted through the PUCCH. Also, the priority of a PUSCH may be changed based on the characteristics of UCI that is transmitted through the corresponding PUSCH with UCI. Examples of priorities determined based on the characteristics of UCI may include SR>HARQ-ACK>CSI report type 3, 5, 6, or 2a>CSI report type 1, 1a, 2, 2b, 2c, or 4. Priorities of PUCCHs and PUSCHs with UCI may be determined based on the priories determined based on the characteristic of UCI. As a matter of course, a PUSCH without UCI has a relatively low priority. Among PUSCHs without UCI, priorities may be determined based on whether it belongs to MCG/SCG or based on a QoS level.

Hereinafter, PUSCH/PUCCH power control (and scaling) methods according to the present invention will be described, and at least one of the priorities may be applied to the methods of the present invention. In addition, the PUSCH/PUCCH power control (and scaling) methods assume the power limited case with respect to a UE.

Case 1: No PUSCH Transmission with UCI

Method 1: No PUCCH Power Scaling

When a PUSCH transmission with UCI does not exist in a subframe i and a total transmit power of a UE exceeds $\hat{P}_{CMAX}(i)$, the UE executes power scaling of $\hat{P}_{PUSCH,k,c}(i)$ with respect to a serving cell c in the subframe i of a MCG and an SCG, as shown in Equation 4 provided below.

$$\sum_k \sum_c w_k(i) \cdot \hat{P}_{PUSCH,k,c}(i) \le \left( \hat{P}_{CMAX}(i) - \sum_k \hat{P}_{PUCCH,k}(i) \right) \quad \text{[Equation 4]}$$

Referring to Equation 4. $\hat{P}_{PUCCH,k}(i)$ is a linear value of $P_{PUCCH,k}(i)$, and $P_{PUCCH,k}(i)$ denotes a PUCCH transmission power in a subframe i with respect to an eNB or a cell group k. $\hat{P}_{PUSCH,k,c}(i)$ is a linear value of $P_{PUSCH,k,c}(i)$. $P_{PUSCH,k,c}(i)$ denotes a PUSCH transmission power for a serving cell c, in a subframe i for an eNB or a cell group k. k denotes an eNB or cell group indicator. k denotes an eNB indicator indicating an eNB to which (a cell group through which) a PUSCH is transmitted from among eNBs (MeNB and SeNB) or (cell groups (MCG and SCG)) having dual connectivity. For example, k=0 indicates a MeNB or a MCG, and k=1 indicates a SeNB or a SCG. $\hat{P}_{CMAX}(i)$ is a linear value of a total configured maximum output power $P_{CMAX}$, configured for a UE in a subframe i. $w_k(i)$ denotes a scaling factor of $\hat{P}_{PUSCH,k,c}(i)$ $\hat{P}_{PUSCH,k,c}(i)$ with respect to a serving cell c associated with a predetermined eNB or cell group. $w_k(i)$ has a value from 0 to 1 ($0 \le w_k(i) \le 1$). $w_k(i)$ has an identical value with respect to all serving cells in a single eNB (or a single cell group). That is, $w_k(i)$ is an eNB (or cell group)-specific parameter. When a PUCCH transmission does not exist in a subframe i with respect to a corresponding eNB or cell group, $\hat{P}_{PUCCH,k}(i)$ may be 0. For example, when a PUCCH transmission does not exist in the subframe i with respect to a MCG, $\hat{P}_{PUCCH,k=0}(i)=0$, and when a PUCCH transmission does not exist in the subframe i with respect to a SCG, $\hat{P}_{PUCCH,k=1}(i)=0$.

Basically, the method prioritizes a PUCCH transmission over a PUSCH transmission, irrespective of a cell group in dual connectivity. The method does not execute PUCCH power scaling. Case 1 does not include a PUSCH transmission with UCI, and thus, PUSCH power scaling may be executed by applying an independent scaling factor $w_k(i)$ to a PUSCH transmission, for each eNB (or each cell group) in dual connectivity.

When PUSCHs without UCI are transmitted over a plurality of serving cells in a single cell group, equal scaling may be executed with respect to the transmission of PUSCHs, like the scaling method used for the existing uni-connectivity.

In addition, as described above, independent scheduling based on different QoSs may be supported for a UE for which dual connectivity is configured. In this instance, different power scaling may be supported based on a MCG or a SCG. Therefore, $w_k(i)$, which is an eNB (or cell group)-specific parameter, may be used.

For example, Case 1 does not transmit a PUSCH with UCI in a MCG and a SCG, and thus, a smaller power scaling may be applied to a PUSCH transmission in the MCG where an RRC message is transmitted or a PUSCH transmission in a cell group (MCG or SCG) having a relatively higher QoS. When a smaller power scaling is applied, a relatively higher power may be allocated. That is, the PUSCH transmission in the MCG where an RRC message is transmitted or the PUSCH transmission in the cell group (MCG or SCG) having a relatively higher QoS may have a higher priority.

Figure 11:
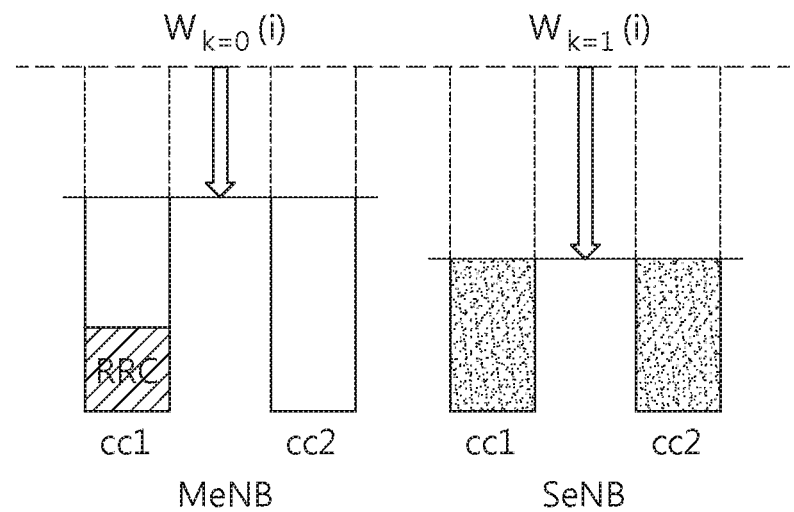
FIG. 11 shows two diagrams illustrating examples of non-equal power scaling between cell groups for Case 1, according to one or more exemplary embodiments.
Figure 11:
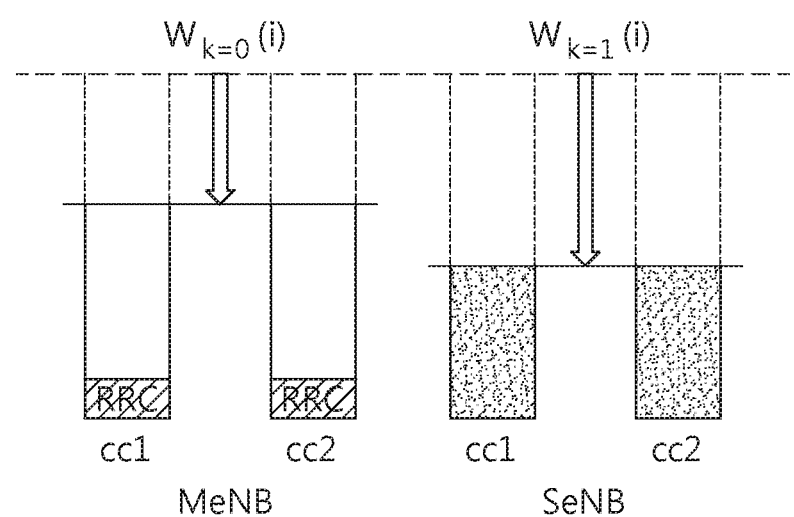

FIG. 11 shows two diagrams illustrating examples of non-equal power scaling between cell groups for Case 1, according to one or more exemplary embodiments. In FIG. 11's embodiments may assume power scaling with respect to a PUSCH transmission without UCI. In FIG. 11, CC1 and CC2 of an MeNB belongs to an MCG, and CC1 and CC2 of an SeNB belongs to an SCG.

(a) in the FIG. 11 is the case where an RRC message is transmitted in only CC1 of an MeNB, and (b) in the FIG. 11 is the case where an RRC message is transmitted in both CC and CC2 of a MCG of the MeNB. Based on the embodiment of a UE and an eNB, the RRC Message may be transmitted through a single cell (CC1) of the MCG, or may be transmitted through two cells (CC1 and CC2) of the MCG.

A smaller power scaling (that is, applying a large scaling factor) may be executed with respect to a PUSCH transmission without UCI in the MCG where an RRC message may be transmitted, as illustrated in FIG. 11. That is, the PUSCH transmission without UCI in the MCG may have a higher priority than a PUSCH transmission without UCI in an SCG. Alternatively, a smaller power scaling may be executed with respect to a PUSCH transmission without UCI in a cell group having a higher QoS. That is, the PUSCH transmission without UCI in the cell group having a higher QoS may have a higher priority than a PUSCH transmission without UCI in a cell group having a lower QoS.

(2) Method 2: PUCCH Power Scaling

Equation 4 of Method 1 does not take into account power scaling with respect to a PUCCH transmission, and only takes into consideration power scaling with respect to a PUSCH transmission without UCI even though PUCCH transmission occurs in both of the two cell groups. Under assumption that a PUCCH transmission in each cell group is power scaled, when a PUSCH transmission with UCI does not exist in a subframe i and a total transmit power of a UE exceeds $\hat{P}_{CMAX}(i)$, the UE may execute power scaling of $P_{PUCCH,k}(i)$ and $\hat{P}_{PUSCH,k,c}(i)$ with respect to a serving cell c, in the subframe i with respect to an MCG and an SCG, as shown in Equations 5 and 6.

$$\sum_k g_k(i) \cdot \hat{P}_{PUCCH,k}(i) \le \hat{P}_{CMAX}(i) \quad \text{[Equation 5]}$$

$$\sum_k \sum_c w_k(i) \cdot \hat{P}_{PUSCH,k,c}(i) \le \quad \text{[Equation 6]}$$

$$\left( \hat{P}_{CMAX}(i) - \sum_k g_k(i) \cdot \hat{P}_{PUCCH,k}(i) \right)$$

Referring to Equation 5 and Equation 6, $g_k(i)$ is a scaling factor for $\hat{P}_{PUCCH,k}(i)$. $g_k(i)$ has a value from 0 to 1 ($0 \le g_k(i) \le 1$). k in $g_k(i)$ indicates a predetermined eNB or cell group. That is, $g_k(i)$ may be used for power scaling for a PUCCH transmitted over a predetermined eNB or cell group. $g_k(i)$ values for an MeNB (or MCG) and an SeNB (or SCG) may or may not be identical. For example, when an identical $g_k(i)$ value is used for the MeNB (or MCG) and the SeNB (or SCG), it may be expressed as g(i). When a PUCCH transmission does not exist in a subframe i with respect to a corresponding eNB or cell group, $\hat{P}_{PUCCH,k}(i)$ may be 0. For example, when a PUCCH transmission does not exist in the subframe i with respect to a MCG, $\hat{P}_{PUCCH,k=0}(i)=0$, and when a PUCCH transmission does not exist in the subframe i with respect to a SCG, $\hat{P}_{PUCCH,k=1}(i)=0$.

(3) Method 3: The Case that Prioritizes a PUCCH Transmission of a Predetermined Cell Group.

Method 3 does not use a separate scaling factor $g_k(i)$ for a PUCCH, unlike Method 2. Method 3 prioritizes a PUCCH transmission corresponding to a predetermined cell group, sets a PUCCH transmission corresponding to the remaining cell group to have a subsequent priority, performs power allocation, and executes scaling for a PUSCH transmission without UCI based on $w_k(i)$. In this instance, control of $\hat{P}_{PUCCH,k}(i)$ and $\hat{P}_{PUSCH,k,c}(i)$ may be executed based on Equation 7 and Equation 8, provided below.

$$\hat{P}_{PUCCH,k=1}(i) = \qquad \text{[Equation 7]}$$
$$\min\left(\hat{P}_{PUCCH,k=1}(i), \left(\hat{P}_{CMAX}(i) - \hat{P}_{PUCCH,k=0}(i)\right)\right)$$

$$\sum_k \sum_c w_k(i) \cdot \hat{P}_{PUSCH,k,c}(i) \leq \left(\hat{P}_{CMAX}(i) - \sum_k \hat{P}_{PUCCH,k}(i)\right) \qquad \text{[Equation 8]}$$

Referring to Equation 7, through min operation, only when $\hat{P}_{PUCCH,k=1}(i)$ is greater than $\hat{P}_{CMAX}(i) - \hat{P}_{PUCCH,k=1}(i)$, $\hat{P}_{PUCCH,k=1}(i)$ may be adjusted to $\hat{P}_{CMAX}(i) - \hat{P}_{PUCCH,k=1}(i)$.

In Equation 7 and Equation 8, when a PUCCH transmission does not exist in a subframe i for an MCG, $\hat{P}_{PUCCH,k=0}(i)=0$, and when a PUCCH transmission does not exist in a subframe i for an SCG, $\hat{P}_{PUCCH,k=1}(i)=0$. When a PUCCH transmission does not exist in a subframe i for both the MCG and the SCG, $\hat{P}_{PUCCH,k}(i)=0$.

(4) Method 4: The Case where a PUSCH Transmission without UCI is Executed in Only a Single Cell Group (MCG or SCG), and PUCCH Power Scaling is not Executed (not PUCCH Power Scaling)

When a PUSCH transmission with UCI does not exist in a subframe i, a PUSCH transmission without UCI is executed in only a single cell group (MCG or SCG), and a total transmit power of a UE exceeds $\hat{P}_{CMAX}(i)$, the UE may execute power scaling of $\hat{P}_{PUSCH,k,c}(i)$ with respect to a serving cell, in a subframe i for only the single cell group, as shown in Equation 9 provided below.

$$\sum_c w_k(i) \cdot \hat{P}_{PUSCH,k,c}(i) \leq \left(\hat{P}_{CMAX}(i) - \sum_k \hat{P}_{PUCCH,k}(i)\right) \qquad \text{[Equation 9]}$$

Here, k is 0 or 1, and the value may be determined based on the cell group where a PUSCH without UCI is transmitted. For example, when a PUSCH without UCI is transmitted in an MCG, k=0. Alternatively, when a PUSCH without UCI is transmitted in an SCG, k=1. The k value corresponding to the MCG/SCG is merely an example, which may be differently determined based on the agreement between an eNB and a UE. When a PUCCH transmission does not exist in a subframe i for the MCG, $\hat{P}_{PUCCH,k=0}(i)=0$, and when a PUCCH transmission does not exist in a subframe i for the SCG. $P_{PUCCH,k=1}(i)=0$.

The method basically prioritizes a PUCCH transmission over a PUSCH transmission. The method does not execute PUCCH power scaling.

When PUSCHs without UCI are transmitted over a plurality of serving cells in a single cell group, equal scaling may be executed with respect to the transmission of PUSCHs.

(5) Method 5: The Case where a PUSCH Transmission without UCI is Executed in Only a Single Cell Group (MCG or SCG), and PUCCH Power Scaling is Executed Equation 9 of Method 4 does not take into account power scaling with respect to a PUCCH transmission, and only takes into consideration power scaling with respect to a PUSCH transmission without UCI even though PUCCH transmission occurs in both of the two cell groups. Under assumption that a PUCCH transmission is also power scaled, when a PUSCH transmission with UCI does not exist in a subframe i, a PUSCH transmission without UCI is executed in only a single cell group (MCG or SCG), and a total transmit power of a UE exceeds $\hat{P}_{CMAX}(i)$, the UE may execute power scaling of $\hat{P}_{PUCCH,k}(i)$ and $\hat{P}_{PUSCH,k,c}(i)$ with respect to a serving cell c, in the subframe i with respect to an MCG and an SCG, as shown in Equations 10 and 11.

$$\sum_k w_{PUCCH,k}(i) \cdot \hat{P}_{PUCCH,k}(i) \leq \hat{P}_{CMAX}(i) \qquad \text{[Equation 10]}$$

$$\sum_c w_k(i) \cdot \hat{P}_{PUSCH,k,c}(i) \leq \qquad \text{[Equation 11]}$$
$$\left(\hat{P}_{CMAX}(i) - \sum_k w_{PUCCH,k}(i) \cdot \hat{P}_{PUCCH,k}(i)\right)$$

Here, $w_{PUCCH,k}(i)$ is a scaling factor for $\hat{P}_{PUCCH,k}(i)$. $w_{PUCCH,k}(i)$ has a value from 0 to 1 ($0 \leq w_{PUCCH,k}(i) \leq 1$). k in $w_{PUCCH,k}(i)$ may indicate a predetermined eNB or cell group. That is, $w_{PUCCH,k}(i)$ may be used for power scaling for a PUCCH transmitted over a predetermined eNB or cell group. $w_{PUCCH,k}(i)$ values for an MeNB (or MCG) and an SeNB (or SCG) may or may not be identical. $w_{PUCCH,k}(i)$ may be interchangeably used with $g_k(i)$. When a PUCCH transmission does not exist in a subframe i for the MCG, $\hat{P}_{PUCCH,k=0}(i)=0$, and when a PUCCH transmission does not exist in a subframe i for the SCG. $\hat{P}_{PUCCH,k=1}(i)=0$. When a PUCCH transmission does not exist in a subframe i for both the MCG and the SCG, $\hat{P}_{PUCCH,k}(i)=0$.

(6) Method 6: The Case where a PUSCH Transmission without UCI is Executed in Only a Single Cell Group (MCG or SCG), and Prioritizes a PUCCH Transmission of a Predetermined Cell Group Method 6 does not use a separate scaling factor $w_{PUCCH,k}(i)$ for a PUCCH, unlike Method 5. Method 6 prioritizes a PUCCH transmission corresponding to a predetermined cell group, sets a PUCCH transmission corresponding to the remaining cell group to have a subsequent priority, performs power allocation, and executes scaling for a PUSCH transmission without UCI based on $w_k(i)$. In this instance, control of $\hat{P}_{PUCCH,k}(i)$ and $\hat{P}_{PUSCH,k,c}(i)$ may be executed based on Equation 12 and Equation 13 provided below.

$$\hat{P}_{PUCCH,k=1}(i) = \qquad \text{[Equation 12]}$$
$$\min\left(\hat{P}_{PUCCH,k=1}(i), \left(\hat{P}_{CMAX}(i) - \hat{P}_{PUCCH,k=0}(i)\right)\right)$$

$$\sum_c w_k(i) \cdot \hat{P}_{PUSCH,k,c}(i) \leq \qquad \text{[Equation 13]}$$
$$\left(\hat{P}_{CMAX}(i) - \sum_k w_{PUCCH,k}(i) \cdot \hat{P}_{PUCCH,k}(i)\right)$$

Here, when a PUCCH transmission does not exist in a subframe i for the MCG, $\hat{P}_{PUCCH,k=0}(i)=0$, and when a PUCCH transmission does not exist in a subframe i for the SCG, $\hat{P}_{PUCCH,k=1}(i)=0$. When a PUCCH transmission does not exist in a subframe i for both the MCG and the SCG, $\hat{P}_{PUCCH,k}(i)=0$.

Case 2: PUSCH Transmission with UCI Exists in Only a Single Cell Group (1) Method 1: No PUCCH Power Scaling When a UE simultaneously transmits a PUCCH and a PUSCH with UCI in a serving cell j in a single cell group, transmits a PUSCH without UCI in any of the remaining serving cells (serving cells in the other cell group), and a total transmit power of the UE exceeds $\hat{P}_{CMAX}(i)$, the UE may obtain $\hat{P}_{PUSCH,k_{UCI},j}(i)$ and $\hat{P}_{PUSCH,k,c}(i)$ as shown in equations provided below.

$$\hat{P}_{PUSCH,k_{UCI},j}(i) = \quad [\text{Equation 14}]$$

$$\min\left(\hat{P}_{PUSCH,k_{UCI},j}(i), \left(\hat{P}_{CMAX}(i) - \sum_k \hat{P}_{PUCCH,k}(i)\right)\right)$$

$$\sum_k \sum_{c \neq j} w_k(i) \cdot \hat{P}_{PUSCH,k,c}(i) \leq \quad [\text{Equation 15}]$$

$$\left(\hat{P}_{CMAX}(i) - \hat{P}_{PUSCH,k_{UCI},j}(i) - \sum_k \hat{P}_{PUCCH,k}(i)\right)$$

Here, $\hat{P}_{PUSCH,k_{UCI},j}(i)$ is a linear value of $P_{PUSCH,k_{UCI},j}(i)$, and $P_{PUSCH,k_{UCI},j}(i)$ is a PUSCH transmission power for a serving cell j in a subframe i associated with a cell group k where a PUSCH with UCI is transmitted (in this instance, the PUSCH for the serving cell j corresponds to a PUSCH with UCI). $\hat{P}_{PUCCH,k}(i)$ is a linear value of $P_{PUCCH,k}(i)$, and $P_{PUCCH,k}(i)$ denotes a PUCCH transmission power in the subframe i for the cell group k. $\hat{P}_{PUSCH,k,c}(i)$ is a linear value of $P_{PUSCH,k,c}(i)$, and $P_{PUSCH,k,c}(i)$ denotes a PUSCH transmission power for a serving cell c in the subframe i for the cell group k. k denotes an eNB or cell group indicator. k denotes an eNB (or cell group) indicator indicating an eNB to which (a cell group through which) a PUSCH is transmitted from among eNBs (MeNB and SeNB) or (cell groups (MCG and SCG)) in dual connectivity. For example, k=0 indicates a MeNB or a MCG, and k=1 indicates a SeNB or a SCG. $\hat{P}_{CMAX}(i)$ is a linear value of a total configured maximum output power $P_{CMAX}$ configured for a UE in a subframe i. $w_k(i)$ denotes a scaling factor of $\hat{P}_{PUSCH,k,c}(i)$ with respect to a serving cell c associated with a predetermined eNB or cell group. $w_k(i)$ has a value from 0 to 1 ($0 \leq w_k(i) \leq 1$). $w_k(i)$ has an identical value with respect to all serving cells in a single eNB (or a single cell group). That is, $w_k(i)$ is an eNB (or cell group)-specific parameter. When a PUCCH transmission does not exist in a subframe i with respect to a corresponding eNB or cell group, $\hat{P}_{PUCCH,k}(i)$ may be 0. For example, when a PUCCH transmission does not exist in the subframe i with respect to a MCG, $\hat{P}_{PUCCH,k=0}(i)=0$, and when a PUCCH transmission does not exist in the subframe i with respect to a SCG, $\hat{P}_{PUCCH,k=1}(i)=0$.

Figure 12:
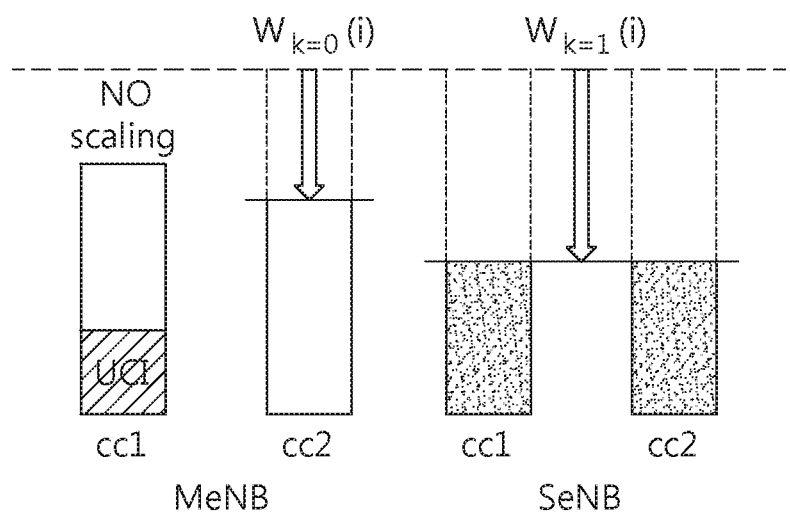
FIG. 12 is a diagram illustrating an example of power scaling with respect to a PUSCH with Uplink Control Information (UCI) and a PUSCH without UCI for Case 2, according to one or more exemplary embodiments.

FIG. 12 is a diagram illustrating an example of power scaling with respect to a PUSCH with UCI and a PUSCH without UCI for Case 2, according to one or more exemplary embodiments. In FIG. 12, CC1 and CC2 of an MeNB belongs to an MCG, and CC1 and CC2 of an SeNB belongs to an SCG.

Referring to FIG. 12, a PUSCH with UCI is transmitted in a subframe i on CC1 of an MeNB. Therefore, power scaling using a scaling factor may not be executed with respect to the PUSCH transmission with UCI in the subframe i on CC1 of the MeNB. With respect to a PUSCH transmission without UCI in a subframe i on CC2 of the MeNB, power scaling based on $w_{k=0}(i)$ may be executed. With respect to a PUSCH transmission without UCI in a subframe i on both CC1 and CC2 of an SeNB, power scaling based on $w_{k=1}(i)$ may be executed. In this instance, a smaller power scaling may be executed with respect to the PUSCH transmission without UCI in the MCG. That is, the PUSCH transmission without UCI in the MCG may have a higher priority than a PUSCH transmission without UCI in the SCG. Alternatively, a smaller power scaling may be executed with respect to a PUSCH transmission without UCI in a cell group having a higher QoS. That is, the PUSCH transmission without UCI in the cell group having a higher QoS may have a higher priority than a PUSCH transmission without UCI in a cell group having a lower QoS.

The method basically prioritizes a PUCCH transmission over a PUSCH transmission, irrespective of a cell group in dual connectivity, and prioritizes a PUSCH transmission with UCI over a PUSCH transmission without UCI. Therefore, the method does not execute power scaling of a PUCCH and a PUSCH with UCI (the power scaling for a PUSCH with UCI will be described later). However, power scaling based on $w_k(i)$ may be executed for a PUSCH transmission without UCI.

In this instance, when $$\sum_k \sum_{c \neq j} w_k(i) \cdot \hat{P}_{PUSCH,k,c}(i) = 0$$

is not satisfied and a total transmit power of the UE does not exceed $\hat{P}_{CMAX}(i)$, power scaling may not be applied with respect to $\hat{P}_{PUSCH,k_{UCI},j}(i)$. However, when $$\sum_k \sum_{c \neq j} w_k(i) \cdot \hat{P}_{PUSCH,k,c}(i) = 0$$

is satisfied and a total transmit power of the UE still exceeds $\hat{P}_{CMAX}(i)$, power scaling may need to be applied with respect to $\hat{P}_{PUSCH,k_{UCI},j}(i)$. This will be described through Method 2 provided below.

(2) Method 2: PUCCH and PUSCH (w/UCI) Power Scaling

Equation 14 does not take into account power scaling with respect to a PUCCH transmission and a PUSCH transmission with UCI. When it is assumed that the PUCCH transmission and the PUSCH transmission with UCI are also power scaled, the UE may obtain $\hat{P}_{PUCCH,k}(i)$, $\hat{P}_{PUSCH,k_{UCI},j}(i)$, and $\hat{P}_{PUCCH,k}(i)$, as shown in equations provided below.

$$\left(\sum_k g_k(i) \cdot \hat{P}_{PUCCH,k}(i)\right) + h_{k_{UCI}}(i) \cdot \hat{P}_{PUSCH,k_{UCI},j}(i) \leq \quad [\text{Equation 16}]$$

$$\hat{P}_{CMAX}(i)$$

$$\sum_k \sum_{c \neq j} w_k(i) \cdot \hat{P}_{PUSCH,k,c}(i) \leq \quad [\text{Equation 17}]$$

$$\left(\hat{P}_{CMAX}(i) - \left(\sum_k g_k(i) \cdot \hat{P}_{PUCCH,k}(i)\right) + h_{UCI}(i) \cdot \hat{P}_{PUSCH,k_{UCI},j}(i)\right)$$

Here, $g_k(i)$ is a scaling factor for $\hat{P}_{PUCCH,k}(i)$. $g_k(i)$ has a value from 0 to 1 ($0 \leq g_k(i) \leq 1$). k in $g_k(i)$ indicates a predetermined eNB or cell group. That is, $g_k(i)$ may be used for power scaling for a PUCCH transmitted over a predetermined eNB or cell group. $g_k(i)$ values for an MeNB (or MCG) and an SeNB (or SCG) may or may not be identical. Also, $h_{k_{UCI}}(i)$ is a scaling factor for $\hat{P}_{PUSCH,k_{UCI}}(i)$. $h_{k_{UCI}}(i)$ has a value from 0 to 1 ($0 \leq h_{k_{UCI}}(i) \leq 1$). Here, $k_{UCI}$ denotes a cell group including a cell through which a PUSCH with corresponding UCI is transmitted. When a PUCCH transmission does not exist in a subframe i with respect to a corresponding eNB or cell group, $\hat{P}_{PUCCH,k}(i)$ may be 0. For example, when a PUCCH transmission does not exist in the subframe i with respect to a MCG, $\hat{P}_{PUCCH,k=0}(i)=0$, and when a PUCCH transmission does not exist in the subframe i with respect to a SCG, $\hat{P}_{PUCCH,k=1}(i)=0$.

According to the method, power scaling is executed with respect to a PUSCH transmission without UCI, and power scaling may be independently executed for each of a PUSCH transmission and a PUSCH transmission with UCI.

Figure 13:
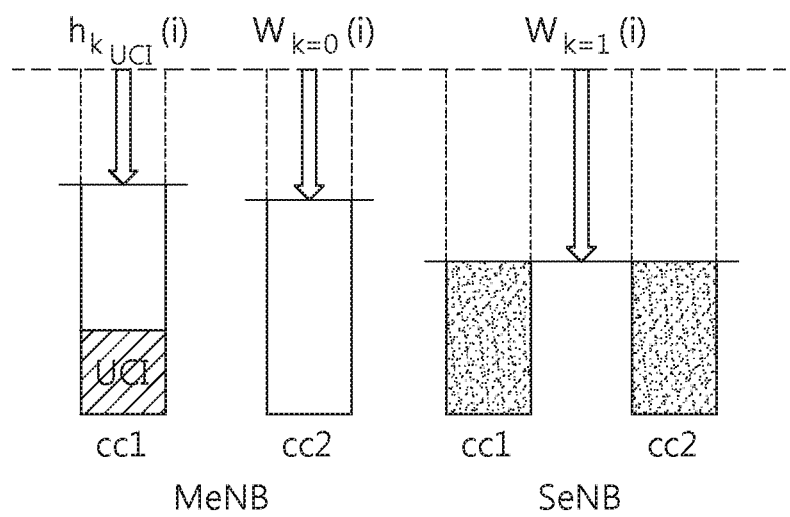
FIG. 13 is a diagram illustrating another example of power scaling with respect to a PUSCH with UCI and a PUSCH without UCI for Case 2, according to one or more exemplary embodiments.

FIG. 13 is a diagram illustrating another example of power scaling with respect to a PUSCH with UCI and a PUSCH without UCI for Case 2, according to one or more exemplary embodiments. In FIG. 13, CC1 and CC2 of an MeNB belongs to an MCG, and CC1 and CC2 of an SeNB belongs to an SCG.

Referring to FIG. 13, a PUSCH with UCI is transmitted in a subframe i on CC1 of the MeNB. Therefore, power scaling using a scaling factor $h_{k_{UCI}}(i)$ may be executed with respect to the PUSCH transmission with UCI in the subframe i on CC1 of the MeNB. With respect to a PUSCH transmission without UCI in a subframe i on CC2 of the MeNB, power scaling based on $w_{k=0}(i)$ may be executed. With respect to a PUSCH transmission without UCI in a subframe i on both CC1 and CC2 of the SeNB, power scaling based on $w_{k=1}(i)$ may be executed. In this instance, power scaling using $g_k(i)$ may be executed with respect to a PUCCH transmission in the subframe I (not illustrated).

Case 3: PUSCH Transmission with UCI Exists in all Cell Groups (1) Method 1: No PUCCH Power Scaling When a UE simultaneously transmits a PUCCH and a PUSCH with UCI in a serving cell j and a serving cell 1 in each cell group (MCG and SCG), transmits a PUSCH without UCI in any of the remaining serving cells, and a total transmit power of the UE exceeds $\hat{P}_{CMAX}(i)$, the UE may obtain $\hat{P}_{PUSCH,k=0,j}(i)$, $\hat{P}_{PUSCH,k=1,j}(i)$, and $\hat{P}_{PUSCH,k,c}(i)$ as shown in the equations provided below.

$$\hat{P}_{PUSCH,k=0,j}(i) = \quad \text{[Equation 18]}$$
$$\min\left(\hat{P}_{PUSCH,k=0,j}(i), \left(\hat{P}_{CMAX}(i) - \sum_k \hat{P}_{PUCCH,k}(i)\right)\right)$$

$$\hat{P}_{PUSCH,k=1,j}(i) = \min\left(\hat{P}_{PUSCH,k=1,j}(i), \quad \text{[Equation 19]}\right.$$
$$\left.\left(\hat{P}_{CMAX}(i) - \hat{P}_{PUSCH,k=0,j}(i) - \sum_k \hat{P}_{PUCCH,k}(i)\right)\right)$$

$$\sum_k \sum_{\substack{c \neq j \\ c \neq l}} w_k(i) \cdot \hat{P}_{PUSCH,k,c}(i) \leq \left(\hat{P}_{CMAX}(i) - \quad \text{[Equation 20]}\right.$$
$$\left.\hat{P}_{PUSCH,k=0,j}(i) - \hat{P}_{PUSCH,k=1,l}(i) - \sum_k \hat{P}_{PUCCH,k}(i)\right)$$

Here, $\hat{P}_{PUSCH,k=0,j}(i)$ is a linear value of $P_{PUSCH,k=0,j}(i)$, which is a transmission power with respect to a PUSCH with UCI that is transmitted through the serving cell j of the MCG in the subframe i. $\hat{P}_{PUSCH,k=1,j}(i)$ is a linear value of $\hat{P}_{PUSCH,k=1,j}(i)$, which is a transmission power with respect to a PUSCH with UCI that is transmitted through the serving cell 1 of the SCG in the subframe i. Although it is described that k=0 corresponds to the MCG, k=1 corresponds to the SCG, the serving cell for the PUSCH transmission with UCI of the MCG is serving cell j, and the serving cell for the PUSCH transmission with UCI of the SCG is serving cell 1, this merely an example, which may be differently expressed based on the agreement between a UE and an eNB.

Figure 14:
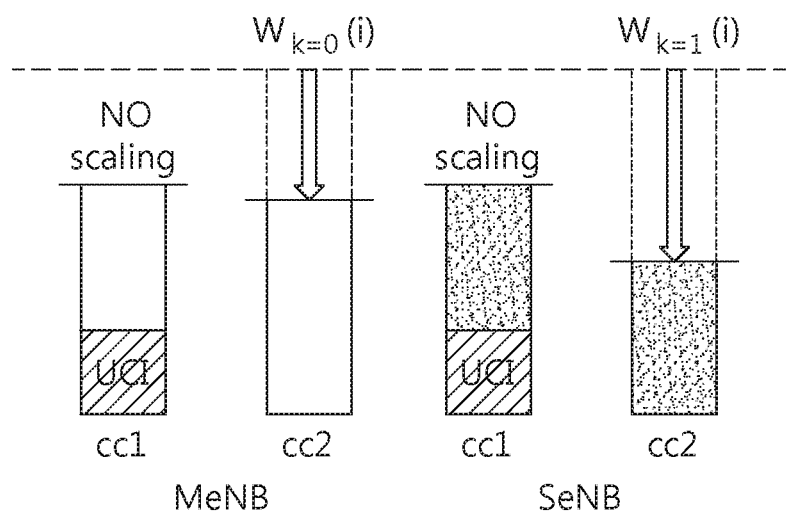
FIG. 14 is a diagram illustrating an example of power scaling with respect to a PUSCH with UCI and a PUSCH without UCI for Case 3, according to one or more exemplary embodiments.

FIG. 14 is a diagram illustrating an example of power scaling with respect to a PUSCH with UCI and a PUSCH without UCI for Case 3, according to one or more exemplary embodiments. In FIG. 14, CC1 and CC2 of an MeNB belongs to an MCG, and CC1 and CC2 of an SeNB belongs to an SCG.

Referring to FIG. 14, a PUSCH with UCI is transmitted in a subframe i on CC1 of the MeNB and a PUSCH with UCI is transmitted in a subframe i on CC1 of the SeNB. Therefore, power scaling using a scaling factor may not be executed with respect to the PUSCH transmission with UCI in the subframe i on CC1 of the MeNB and the subframe i on CC1 of the SeNB. Conversely, power scaling based on $w_{k=0}(i)$ and $w_{k=1}(i)$ may be executed with respect to a PUSCH transmission without UCI in a subframe i on CC2 of the MeNB and a subframe i on CC2 of the SeNB, respectively. In this instance, a smaller power scaling may be executed with respect to a PUSCH transmission without UCI in the MCG or a PUSCH transmission without UCI in a cell group having a higher QoS. That is, the PUSCH transmission without UCI in the MCG may have a higher priority than a PUSCH transmission without UCI in the SCG Alternatively, the PUSCH transmission without UCI in the cell group having a higher QoS may have a higher priority than a PUSCH transmission without UCI in a cell group having a lower QoS.

The method basically prioritizes a PUCCH transmission over a PUSCH transmission, irrespective of a cell group, and prioritizes a PUSCH transmission with UCI over a PUSCH transmission without UCI. Therefore, the method does not execute power scaling of a PUCCH and a PUSCH with UCI (the power scaling for a PUSCH with UCI will be described later). However, power scaling based on $w_k(i)$ may be executed for a PUSCH transmission without UCI.

In this instance, when $$\sum_k \sum_{\substack{c \neq j \\ c \neq l}} w_k(i) \cdot \hat{P}_{PUSCH,k,c}(i) = 0$$

is not satisfied and a total transmit power of the UE does not exceed $\hat{P}_{CMAX}(i)$, power scaling may not be applied with respect to $\hat{P}_{PUSCH,k=0,j}(i)$ and $\hat{P}_{PUSCH,k=1,j}(i)$. However, when $$\sum_k \sum_{\substack{c \neq j \\ c \neq l}} w_k(i) \cdot \hat{P}_{PUSCH,k,c}(i) = 0$$

is satisfied and a total transmit power of the UE still exceeds $\hat{P}_{CMAX}(i)$, power scaling may need to be applied with respect to $\hat{P}_{PUSCH,k=0,j}(i)$ and $\hat{P}_{PUSCH,k=1,j}(i)$. This will be described through Method 2 provided below.

(2) Method 2: PUCCH and PUSCH (w/UCI) Power Scaling

Equation 1 does not take into account power scaling for a PUCCH transmission and a PUSCH transmission with UCI. When it is assumed that the PUCCH transmission and the PUSCH transmission with UCI are also power scaled, the UE may obtain $\hat{P}_{PUCCH,k}(i)$, $\hat{P}_{PUSCH,k=0,j}(i)$, $\hat{P}_{PUSCH,k=1,j}(i)$, and $\hat{P}_{PUSCH,k,c}(i)$, as shown in the equations provided below.

$$\sum_k g_k(i) \cdot \hat{P}_{PUCCH,k}(i) + \quad \text{[Equation 21]}$$
$$\left(h_{k=0}(i) \cdot \hat{P}_{PUSCH,k=0,j}(i) + h_{k=1}(i) \cdot \hat{P}_{PUSCH,k=1,l}(i)\right) \le$$
$$\hat{P}_{CMAX}(i)$$

$$\sum_k \sum_{\substack{c \ne j \\ c \ne l}} w_k(i) \cdot \hat{P}_{PUSCH,k,c}(i) \le \quad \text{[Equation 22]}$$
$$\left(\hat{P}_{CMAX}(i) - \sum_k g_k(i) \cdot \hat{P}_{PUCCH,k}(i) - h_{k=0}(i) \cdot \hat{P}_{PUSCH,k=0,j}(i) - h_{k=1}(i) \cdot \hat{P}_{PUSCH,k=1,l}(i)\right)$$

Here, $g_k(i)$ is a scaling factor for $\hat{P}_{PUCCH,k}(i)$. $g_k(i)$ has a value from 0 to 1 ($0 \le g_k(i) \le 1$). k in $g_k(i)$ indicates a predetermined eNB or cell group. That is, $g_k(i)$ may be used for power scaling for a PUCCH transmitted over a predetermined eNB or cell group. $g_k(i)$ values for an MeNB (or MCG) and an SeNB (or SCG) may or may not be identical. Also, $h_k(i)$ is a scaling factor for $\hat{P}_{PUSCH,k=0,j}(i)$ and $\hat{P}_{PUSCH,k=1,j}(i)$. $h_k(i)$ has a value from 0 to 1 ($0 \le h_k(i) \le 1$). k in $h_k(i)$ may indicate a predetermined eNB or cell group. When a PUCCH transmission does not exist in a subframe i with respect to a corresponding eNB or cell group, $\hat{P}_{PUCCH,k}(i)$ may be 0. For example, when a PUCCH transmission does not exist in the subframe i with respect to a MCG, $\hat{P}_{PUSCH,k=0}(i)=0$, and when a PUCCH transmission does not exist in the subframe i with respect to a SCG, $\hat{P}_{PUSCH,k=1}(i)=0$.

According to the method, power scaling is executed with respect to a PUSCH transmission without UCI, and power scaling may be independently executed for each of a PUSCH transmission and a PUSCH transmission with UCI. In this instance, power scaling with respect to a PUSCH transmission with UCI of the MCG and a PUSCH transmission with UCI of the SCG, may be independently executed.

Figure 15:
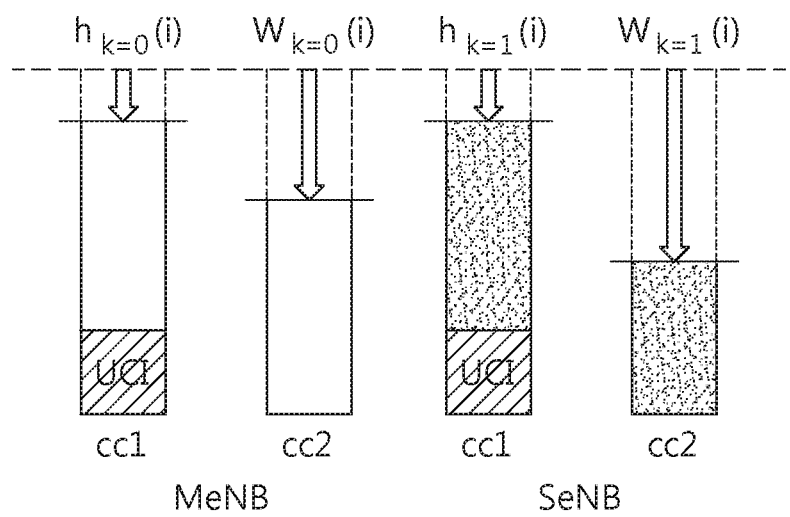
FIG. 15 is a diagram illustrating another example of power scaling with respect to a PUSCH with UCI and a PUSCH without UCI for Case 2, according to one or more exemplary embodiments.

FIG. 15 is a diagram illustrating another example of power scaling with respect to a PUSCH with UCI and a PUSCH without UCI for Case 2, according to one or more exemplary embodiments. In FIG. 15, CC1 and CC2 of an MeNB belongs to an MCG, and CC1 and CC2 of an SeNB belongs to an SCG.

Referring to FIG. 15, a PUSCH with UCI is transmitted in a subframe i on CC1 of the MeNB and a subframe i on CC1 of the SeNB, respectively. In this instance, power scaling using a scaling factor $h_{k=0}(i)$ may be executed with respect to the PUSCH transmission with UCI in the subframe i on CC1 of the MeNB and power scaling using a scaling factor $h_{k=1}(i)$ may be executed with respect to the PUSCH transmission with UCI in the subframe i on CC1 of the SeNB. With respect to a PUSCH transmission without UCI in a subframe i on CC2 of the MeNB, power scaling based on $w_{k=0}(i)$ may be executed. With respect to a PUSCH transmission without UCI in a subframe i on CC2 of the SeNB, power scaling based on $w_{k=1}(i)$ may be executed. In this instance, power scaling using $g_k(i)$ may be executed with respect to a PUCCH transmission in the subframe i.

Figure 16:
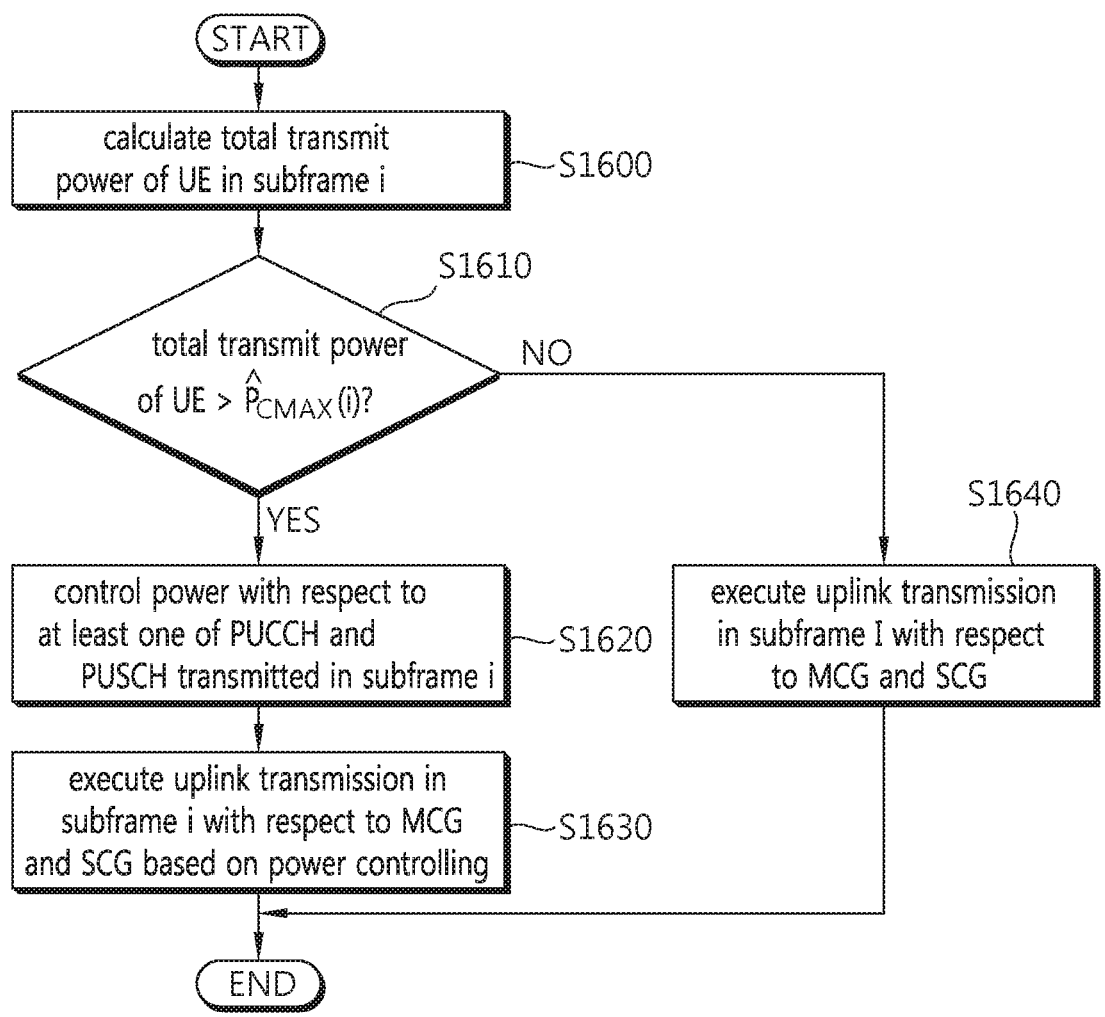
FIG. 16 is an example of a flowchart illustrating an uplink power controlling operation executed by a UE, according to one or more exemplary embodiments.

FIG. 16 is an example of a flowchart illustrating an uplink power controlling operation executed by a UE, according to one or more exemplary embodiments. FIG. 16 assumes that the UE is in dual connectivity.

Referring to FIG. 16, a UE calculates a total transmit power of the UE in a subframe i for an MCG and an SCG, in operation S1600. In this instance, the UE may calculate a transmission power $P_{SRS}$ of an SRS, a transmission power $P_{UL\_CH}$ of an uplink channel(s), and a transmission power $P_{DMRS}$ of a Demodulation Reference Signal (DMRS), with respect to the MCG and the SCG. The uplink channel(s) may include at least one of a PUCCH and a PUSCH. The PUSCH may or may not include UCI. A UE may calculate a total transmit power of a UE with respect to the MCG and the SCG, based on a sum of $P_{SRS}$, $P_{UL\_CH}$, and $P_{DMRS}$.

The UE determines whether the total transmit power of the UE exceeds $\hat{P}_{CMAX}(i)$, in operation S1610. Here, $\hat{P}_{CMAX}(i)$ is a linear value of a total configured maximum output power (or a maximum transmit power) $P_{CMAX}$, configured for a UE in a subframe i. When the total transmit power of the UE exceeds $\hat{P}_{CMAX}(i)$, this may be called as power limited case. The power limited case refers to the case where a required transmission power of a UE indicated by an eNB is higher than a maximum transmission power allowed for the UE while the UE executes uplink transmission, and the required transmission power is limited.

When the total transmit power of the UE exceeds $\hat{P}_{CMAX}(i)$ in operation S1610, the UE may execute power control with respect to at least one of a PUCCH and a PUSCH transmitted in the subframe i with respect to the MCG and the SCG, in operation S1620. Here, power control may include power scaling. An example of power scaling is multiplexing an original transmission power by a scaling factor. In this instance, the UE may apply different power controlling methods based on the number of cell groups (Case 1, Case 2, or Case 3) that transmit a PUSCH with UCI in a predetermined subframe, as described in Table 2. Also, the UE may set priorities as shown in Table 3, and may execute power controlling (and scaling) based on the priorities. In this instance, a scaling factor value may be determined based on a priority.

For example, there is a case (Case 1) in which a cell group that transmits a PUSCH with UCI in a subframe i, does not exist. In this instance, (1) a UE does not execute PUCCH power scaling, and may execute power scaling with respect to $\hat{P}_{PUSCH,k,c}(i)$ based on $w_k(i)$. In this instance, $\hat{P}_{PUSCH,k,c}(i)$ may be scaled based on Equation 4. (2) The UE may execute power scaling with respect to $\hat{P}_{PUCCH,k}(i)$ based on $g_k(i)$. In this instance, $\hat{P}_{PUSCH,k,c}(i)$ and $\hat{P}_{PUCCH,k}(i)$ may be scaled based on Equation 5 and Equation 6. (3) The UE may execute power controlling by prioritizing a PUCCH transmission of a predetermined cell group. In this instance, the UE does not use a separate scaling factor $g_k(i)$ for a PUCCH, prioritizes a PUCCH transmission corresponding to a predetermined cell group, sets a PUCCH transmission corresponding to the remaining cell group as a subsequent priority, so as to allocate power. In this instance, $\hat{P}_{PUCCH,k}(i)$ and $\hat{P}_{PUSCH,k,c}(i)$ may be controlled based on the Equation 7 and Equation 8. (4) When a PUSCH without UCI is transmitted in only a single cell group (MCG or SCG), the UE may execute power scaling with respect to the PUSCH transmission without UCI. In this instance, $\hat{P}_{PUSCH,k,c}(i)$ may be scaled based on Equation 9. (5) When a PUSCH without UCI is transmitted in only a single cell group (MCG or SCG), the UE may execute power scaling with respect to a PUCCH transmission, in addition to power scaling with respect to the PUSCH transmission without UCI. In this instance, $\hat{P}_{PUCCH,k}(i)$ and $\hat{P}_{PUSCH,k,c}(i)$ may be scaled based on Equation 10 and Equation 11. (6) When a PUSCH without UCI is transmitted in only a single cell group (MCG or SCG), the UE may execute power controlling by prioritizing a PUCCH transmission of a predetermined cell group. In this instance, $\hat{P}_{PUCCH,k}(i)$ and $\hat{P}_{PUSCH,k,c}(i)$ may be controlled based on the Equation 12 and Equation 13.

As another example, there is a case (Case 2) in which only a single cell group that transmits a PUSCH with UCI in a subframe i, exists. In this instance, (1) a UE does not execute PUCCH power scaling, and may execute power scaling with respect to $\hat{P}_{PUSCH,k,c}(i)$ based on $w_k(i)$. In this instance, $\hat{P}_{PUSCH,k_{UCI},j}(i)$ and $\hat{P}_{PUSCH,k,c}(i)$ may be scaled based on Equation 14 and Equation 15. (2) The UE may execute power scaling with respect to a PUCCH and a PUSCH with UCI. In this instance. $\hat{P}_{PUCCH,k}(i)$, $\hat{P}_{PUSCH,k_{UCI},j}(\ )$, and $\hat{P}_{PUSCH,k,c}(i)$ may be scaled based on Equation 16 and Equation 17.

As another example, there is a case (Case 3) in which both the MCG and the SCG are cell groups that transmit a PUSCH with UCI in a subframe i. In this instance. (1) the UE does not execute PUCCH power scaling, and may execute power controlling with respect to $\hat{P}_{PUSCH,k=0,j}(i)$, $\hat{P}_{PUSCH,k=1,j}(i)$, and $\hat{P}_{PUSCH,k,c}(i)$, based on Equations 18 to 20. (2) The UE may execute power scaling with respect to a PUCCH and a PUSCH with UCI. In this instance. $\hat{P}_{PUCCH,k}(i)$, $\hat{P}_{PUSCH,k=0,j}(i)$, $\hat{P}_{PUSCH,k=1,j}(i)$, and $\hat{P}_{PUSCH,k,c}(i)$ may be scaled based on Equation 21 and Equation 22.

Subsequently, the UE may execute uplink transmission in a subframe i with respect to the MCG and the SCG, based on the power controlling, in operation S1630.

When the total transmit power of the UE does not exceed $\hat{P}_{CMAX}(i)$ in operation S1610, the UE may execute uplink transmission in the subframe i with respect to the MCG and the SCG, without power controlling, in operation S1640.

Figure 17:
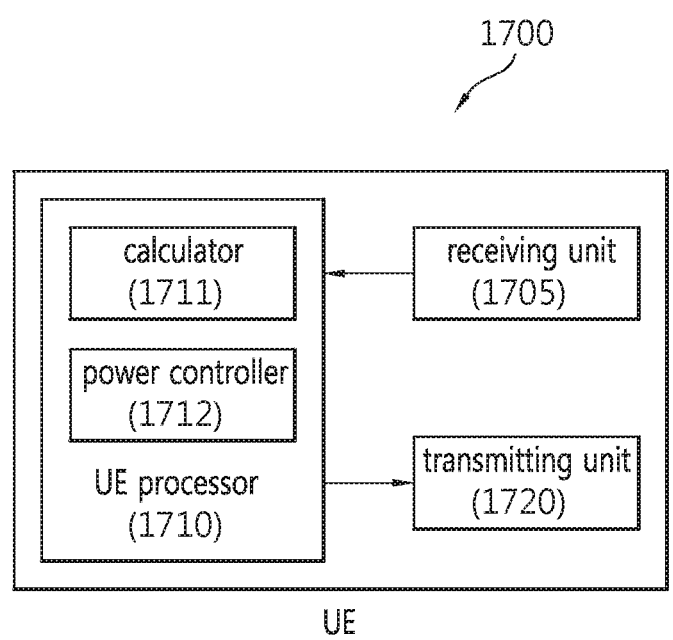
FIG. 17 is an example of a block diagram illustrating a UE, according to one or more exemplary embodiments.

FIG. 17 is an example of a block diagram illustrating a UE, according to one or more exemplary embodiments.

Referring to FIG. 17, a UE 1700 includes a receiving unit 1705, a UE processor 1710, and a transmitting unit 1720. The UE processor 1710 may include a calculator 1711 and a power controller 1712.

The receiving unit 1705 may receive a downlink signal from an eNB (not illustrated). The downlink signal may include dual connectivity configuration information. In addition, the downlink signal may include uplink scheduling information for the UE.

The calculator 1711 calculates a total transmit power of the UE in a subframe i for an MCG and an SCG. In this instance, the calculator 1711 may calculate a transmission power $P_{SRS}$ of an SRS, a transmission power $P_{UL\_CH}$ of an uplink channel(s), and a transmission power $P_{DMRS}$ of a Demodulation Reference Signal (DMRS), with respect to the MCG and the SCG. The uplink channel(s) may include at least one of a PUCCH and a PUSCH. The PUSCH may or may not include UCI. The calculator 1711 may calculate a total transmit power of the UE with respect to the MCG and the SCG, based on a sum of $P_{SRS}$, $P_{UL\_CH}$, and $P_{DMRS}$.

The power controller 1712 determines whether the calculated total transmit power of the UE exceeds $\hat{P}_{CMAX}(i)$. $\hat{P}_{CMAX}(i)$ is a linear value of a total configured maximum output power (or a maximum transmission power) $P_{CMAX}$ configured for the UE in the subframe i. The power controller 1712 may execute power controlling with respect to at least one of a PUCCH and a PUSCH transmitted in the subframe i when the calculated total transmit power of the UE exceeds $\hat{P}_{CMAX}(i)$. Here, power control may include power scaling. An example of power scaling is multiplexing an original transmission power by a scaling factor. In this instance, the power controller 1712 may apply different power controlling methods based on the number of cell groups (Case 1, Case 2, or Case 3) that transmit a PUSCH with UCI in a predetermined subframe, as described in Table 2. The power controller 1712 may set priorities as shown in Table 3, and may execute power controlling (and scaling) based on the priorities. In this instance, a scaling factor value may be determined based on a priority.

The transmitting unit 1720 may execute uplink transmission in the subframe i with respect to the MCG and the SCG, based on the power controlling. In this instance, based on the dual connectivity configured for the UE, the transmitting unit 1720 may execute uplink transmission to a MeNB through an MCG, and simultaneously, may execute uplink transmission to an SeNB through the SCG.

According to one or more exemplary embodiments, a UE may control a transmit power of an uplink channel. The UE may be capable of configuring dual connectivity and the transmit power may be controlled when the UE maintains dual connectivity with an MeNB and at least one SeNB.

The UE may establish an RRC connection with a MeNB through a primary serving cell, and the MeNB may be associated with an MCG including one or more serving cells configurable for the UE. The UE may establish a connection with an SeNB, and the SeNB may be associated with an SCG including one or more serving cells configurable for the UE.

The UE may determine to transmit an uplink channel through a serving cell of the MCG and to transmit an uplink channel through a serving cell of the SCG. The UE may determine a priority between the uplink channel determined to be transmitted through the serving cell of the MCG and the uplink channel determined to be transmitted through the serving cell of the SCG, based on Uplink Control Information (UCI) included in at least one of the uplink channels and based on a type of a cell group.

The UE may control the transmit power reduction for a lower-prioritized uplink channel from among the uplink channels, and transmit the uplink channels through the respective serving cells after the control of the transmit power reduction.

Further, the UE may receive an RRC message through the primary serving cell. The RRC message may include carrier aggregation (CA) configuration information, and the CA configuration information may include information of one or more secondary serving cells to be aggregated according to a CA configuration. The one or more serving cells may be included in at least one of the MCG and the SCG.

The uplink channel determined to be transmitted through the serving cell of the MCG and the uplink channel determined to be transmitted through serving cell of the SCG may be configured to be transmitted in subframe i. The UE may determine to reduce a transmit power of at least one uplink channel in response to a determination that the total transmit power exceeds the output power threshold in the subframe i. The output power threshold in the subframe i may correspond to $\hat{P}_{CMAX}(i)$ defined above.

The priority may be determined primarily based on the UCI and determined secondarily based on the type of a cell group. Here, the type of a cell group may include the MCG and the SCG. An uplink channel transmitted through the MCG may have a higher priority than an uplink channel transmitted through the SCG if the lower-prioritized uplink channel is not determined based on the UCI.

If a first uplink channel is determined to be transmitted through a serving cell of the SCG without including UCI and a second uplink channel is determined to be transmitted through a serving cell of the MCG without including UCI, the first uplink channel may be determined to have a lower priority than the second uplink channel by setting a priority for the MCG higher than a priority for the SCG.

If the uplink channels have a same priority based on a UCI criterion, the uplink channel determined to be transmitted through the serving cell of the SCG may be determined to have a lower priority than the uplink channel determined to be transmitted through the serving cell of the MCG. Further, if the uplink channel determined to be transmitted through the serving cell of the SCG includes UCI and the uplink channel determined to be transmitted through the serving cell of the MCG does not include UCI, the uplink channel determined to be transmitted through the serving cell of the MCG may be determined to have a lower priority than the uplink channel determined to be transmitted through the serving cell of the SCG. The uplink channels may include at least one of a Physical Uplink Control Channel (PUCCH) and a Physical Uplink Shared Channel (PUSCH).

The UE may determine that an uplink channel including a Scheduling Request (SR) or a Hybrid Automatic Repeat Request Acknowledgement (HARQ-ACK) has a higher priority than an uplink channel including Channel State Information (CSI). The controlling the transmit power reduction for the lower-prioritized uplink channel may include scaling a transmit power for the lower-prioritized uplink channel. If a PUCCH and a PUSCH to be transmitted in subframe i are determined to have the same priority based on a UCI criterion, the PUCCH may be determined to have a higher priority than the PUSCH.

According to one or more exemplary embodiments, a UE may maintain dual connectivity by connecting to an MeNB and an SeNB. The UE may determine to transmit an uplink channel through a first serving cell of the SCG and to transmit an uplink channel through a second serving cell of the SCG. The UE may determine whether to control a transmit power reduction for at least one of the uplink channel determined to be transmitted through the first serving cell of the SCG and the uplink channel determined to be transmitted through the second serving cell of the SCG. The UE may determine a priority between the uplink channel determined to be transmitted through the serving cell of the MCG and the uplink channel determined to be transmitted through the serving cell of the SCG, based on a determination whether Uplink Control Information (UCI) is included in at least one of the uplink channels and a determination of a UCI characteristic. The UE may control the transmit power reduction for a lower-prioritized uplink channel from among the uplink channels, and transmit the uplink channels through the respective serving cells after the control of the transmit power reduction.

According to one or more exemplary embodiments, the priority may be determined based on the number of cell groups that transmit a PUSCH with UCI from among a Master Cell Group (MCG) and a Secondary Cell Group (SCG). In this instance, PUSCH/PUCCH transmission power controlling may be effectively executed with respect to the UE for which dual connectivity is configured, and the performance of uplink scheduling may be improved.

The above description is to explain exemplary embodiments of inventive concept, and it will be apparent to those skills in the art that modifications and variations can be made without departing from the spirit and scope of inventive concept. Thus, it is intended that the present invention cover the modifications and variations of exemplary embodiments provided they come within the scope of the appended claims and their equivalents.

What is claimed is:

1. A method of controlling a transmit power of a user equipment (UE), comprising:
    establishing a Radio Resource Control (RRC) connection with a master base station through a primary serving cell, the master base station being associated with a Master Cell Group (MCG) including one or more serving cells configurable for the UE;
    establishing a connection with a secondary base station, the secondary base station being associated with a Secondary Cell Group (SCG) including one or more serving cells configurable for the UE; and
    transmitting a first uplink channel through a serving cell of the MCG and a second uplink channel through a serving cell of the SCG, wherein a first transmit power for the first uplink channel and a second transmit power for the second uplink channel are allocated based on a priority, and the priority is determined based on whether Uplink Control Information (UCI) is included in at least one of the first uplink channel or the second uplink channel and based on a type of a cell group.

2. The method according to claim 1, further comprising:
    controlling a transmit power reduction for a lower-prioritized uplink channel from the first uplink channel and the second uplink channel.

3. The method according to claim 1, further comprising:
    receiving, at the UE, an RRC message through the primary serving cell, the RRC message comprising carrier aggregation (CA) configuration information, the CA configuration information comprising information of one or more secondary serving cells to be aggregated according to a CA configuration, and the one or more secondary serving cells being included in at least one of the MCG and the SCG.

4. The method according to claim 1, wherein the first uplink channel and the second uplink channel are configured to be transmitted in subframe i; and
    wherein the transmitting a first uplink channel through a serving cell of the MCG and a second uplink channel through a serving cell of the SCG, comprising:
        determining whether total transmit power for uplink transmissions from the UE in the subframe i exceeds an output power threshold in the subframe i; and
        determining to reduce a transmit power of at least one of the first uplink channel or the second uplink channel in response to a determination that the total transmit power exceeds the output power threshold in the subframe i.

5. The method according to claim 1, wherein the priority is determined primarily based on the UCI and determined secondarily based on the type of the cell group, the type of the cell group comprises the MCG and the SCG, and
    wherein an uplink channel transmitted through the MCG has a higher priority than an uplink channel transmitted through the SCG if a lower-prioritized uplink channel is not determined based on the UCI.

6. The method according to claim 1, wherein
    the first uplink channel has a lower priority than the second uplink channel in case that the UCI is not included in the first uplink channel and is included in the second uplink channel;

the second uplink channel has a lower priority than the first uplink channel in case that the UCI is not included in either the first uplink channel or the second uplink channel; or the second uplink channel has a lower priority than the first uplink channel in case that the first uplink channel and the second uplink channel have a same priority based on a UCI criterion.

7. The method according to claim 1, wherein the first and second uplink channels each comprise at least one of a Physical Uplink Control Channel (PUCCH) or a Physical Uplink Shared Channel (PUSCH).

8. The method according to claim 1, wherein an uplink channel including a Scheduling Request (SR) or a Hybrid Automatic Repeat Request Acknowledgement (HARQ-ACK) has a higher priority than an uplink channel including Channel State Information (CSI).

9. The method according to claim 1, wherein an uplink channel that comprises PUSCH with a HARQ-ACK or a CSI has a higher priority than a PUSCH without a HARQ-ACK or a CSI.

10. A system, comprises a master base station and a secondary base station, wherein a Radio Resource Control (RRC) connection is established between the master base station and a user equipment (UE) through a primary serving cell, the master base station being associated with a Master Cell Group (MCG) including one or more serving cells configurable for the UE;

a connection is established between the secondary base station and the UE, the secondary base station being associated with a Secondary Cell Group (SCG) including one or more serving cells configurable for the UE;

the master base station is configured to receive a first uplink channel through a serving cell of the MCG; and the secondary base station is configured to receive a second uplink channel through a serving cell of the SCG, wherein a first transmit power for the first uplink channel and a second transmit power for the second uplink channel are allocated based on a priority, and the priority is determined based on whether Uplink Control Information (UCI) is included in at least one of the first uplink channel or the second uplink channel and based on a type of a cell group.

11. The system of claim 10, wherein the master base station is further configured to send a radio resource control (RRC) message through the primary serving cell, the RRC message comprising carrier aggregation (CA) configuration information, the CA configuration information comprising information of one or more secondary serving cells to be aggregated according to a CA configuration, and the one or more secondary serving cells being included in at least one of the MCG and the SCG.

12. The system of claim 10, wherein the first uplink channel and the second uplink channel are configured to be transmitted in subframe i;

the master base station is configured to determine an uplink channel to be received from the UE through a serving cell of the MCG in the subframe i, and the secondary base station is configured to determine an uplink channel to be received from the UE through a serving cell of the SCG in the subframe i.

13. The system of claim 10, wherein the first uplink channel and the second uplink channel are configured to be transmitted in subframe i;

the master base station is configured to determine an output power threshold in the subframe i, which is associated with a transmit power reduction for at least one of the first uplink channel determined to be received through a serving cell of the MCG or the second uplink channel determined to be received through a serving cell of the SCG in the subframe i.

14. The system of claim 13 when total transmit power for uplink transmissions from the UE_in the subframe i exceeds the output power threshold in the subframe i, the system is configured to receive at least one uplink channel from the UE in the subframe i with reduced transmit power.

15. The system of claim 14, wherein the output power threshold in the subframe i corresponds to $\hat{P}_{CMAX}(i)$, a linear value of a total configured maximum output power $P_{CMAX}$ configured for the UE in the subframe i.

16. An apparatus, comprising:

a non-transitory memory storage comprising instructions; and one or more hardware processors in communication with the non-transitory memory storage, wherein the one or more hardware processors execute the instructions to cause a user equipment to perform operations comprising:

establishing a Radio Resource Control (RRC) connection with a master base station through a primary serving cell, the master base station being associated with a Master Cell Group (MCG) including one or more serving cells configurable for the UE;

establishing a connection with a secondary base station, the secondary base station being associated with a Secondary Cell Group (SCG) including one or more serving cells configurable for the UE; and transmitting a first uplink channel through a serving cell of the MCG and a second uplink channel through a serving cell of the SCG, wherein a first transmit power for the first uplink channel and a second transmit power for the second uplink channel are allocated based on a priority, and the priority is determined based on whether Uplink Control Information (UCI) is included in at least one of the first uplink channel or the second uplink channel and based on a type of a cell group.

17. The apparatus according to claim 16, wherein the operations further comprise:

controlling a transmit power reduction for a lower-prioritized uplink channel from the first uplink channel and the second uplink channel.

18. The apparatus according to claim 16, wherein the first uplink channel and the second uplink channel are configured to be transmitted in subframe i; and wherein the transmitting a first uplink channel through a serving cell of the MCG and a second uplink channel through a serving cell of the SCG, comprising:

determining whether total transmit power for uplink transmissions from the UE in the subframe i exceeds an output power threshold in the subframe i; and determining to reduce a transmit power of at least one of the first uplink channel or the second uplink channel in response to a determination that the total transmit power exceeds the output power threshold in the subframe i.

19. The apparatus according to claim 16, wherein the priority is determined primarily based on the UCI and determined secondarily based on the type of the cell group, the type of the cell group comprises the MCG and the SCG, and wherein an uplink channel transmitted through the MCG has a higher priority than an uplink channel transmitted through the SCG if a lower-prioritized uplink channel is not determined based on the UCI.

20. The apparatus according to claim 16, wherein
the first uplink channel has a lower priority than the second uplink channel in case that the UCI is not included in the first uplink channel and is included in the second uplink channel;
the second uplink channel has a lower priority than the first uplink channel in case that the UCI is not included in either the first uplink channel or the second uplink channel; or
the second uplink channel has a lower priority than the first uplink channel in case that the first uplink channel and the second uplink channel have a same priority based on a UCI criterion.

21. The apparatus according to claim 16, wherein the first and second uplink channels each comprise at least one of a Physical Uplink Control Channel (PUCCH) or a Physical Uplink Shared Channel (PUSCH).

22. The apparatus according to claim 16, wherein an uplink channel including a Scheduling Request (SR) or a Hybrid Automatic Repeat Request Acknowledgement (HARQ-ACK) has a higher priority than an uplink channel including Channel State Information (CSI).

* * * * *